United States Patent [19]
Koehler et al.

[11] Patent Number: 5,909,773
[45] Date of Patent: Jun. 8, 1999

[54] METHOD OF REPAIRING A DAMAGED WELL

[75] Inventors: Paul C. Koehler; Stephen A. Geibel; Michael B. Whitlock, all of Cortland; Reza Hashemi, Sea Cliff; Christophe A. Malbrel, New York, all of N.Y.

[73] Assignee: Pall Corporation, East Hills, N.Y.

[21] Appl. No.: 08/878,078

[22] Filed: Jun. 18, 1997

Related U.S. Application Data

[60] Division of application No. 08/351,658, Dec. 7, 1994, Pat. No. 5,664,628, which is a continuation-in-part of application No. 08/223,149, Apr. 25, 1994, abandoned, which is a continuation-in-part of application No. 08/065,908, May 25, 1993, abandoned.

[51] Int. Cl.$^6$ ..................................................... E21B 43/10
[52] U.S. Cl. ............................................................. 166/277
[58] Field of Search ................................... 166/277, 369, 166/328

[56] References Cited

U.S. PATENT DOCUMENTS

| | | |
|---|---|---|
| 679,131 | 7/1901 | Thompson . |
| 753,780 | 3/1904 | Woods . |
| 767,234 | 8/1904 | Patterson . |
| 949,357 | 2/1910 | Hebbeler . |
| 1,050,604 | 1/1913 | Biel . |
| 1,229,437 | 6/1917 | Foster . |
| 1,342,986 | 6/1920 | Cater . |
| 1,535,112 | 4/1925 | Duke et al. . |
| 1,547,240 | 7/1925 | Steele . |
| 2,024,646 | 12/1935 | Jones . |
| 2,217,370 | 10/1940 | Johnston . |
| 2,267,918 | 12/1941 | Hildabolt . |
| 2,303,134 | 2/1942 | O'Donnell . |
| 2,371,385 | 12/1945 | Eckel . |
| 2,388,640 | 11/1945 | Moore . |
| 2,523,091 | 6/1950 | Bruce . |
| 2,530,223 | 10/1950 | Breaux . |
| 2,600,150 | 11/1952 | Abendroth . |
| 2,743,743 | 5/1956 | Galloup .................................. 166/277 |
| 2,758,226 | 8/1956 | Fisher . |
| 2,761,829 | 9/1956 | Dolloff ..................................... 204/114 |
| 2,796,939 | 7/1957 | Woodruff . |
| 2,837,032 | 7/1958 | Horsting, Sr. . |
| 2,843,209 | 12/1958 | Degen . |
| 2,877,852 | 3/1959 | Bashara . |
| 2,877,903 | 3/1959 | Veres . |
| 2,944,017 | 7/1960 | Cotton . |
| 2,952,212 | 9/1960 | Coberly . |
| 3,028,915 | 4/1962 | Jennings .................................... 166/46 |
| 3,057,481 | 10/1962 | Pall . |
| 3,107,727 | 10/1963 | Howard . |
| 3,158,532 | 11/1964 | Pall et al. . |
| 3,211,234 | 10/1965 | Sweeney ............................. 175/314 X |

(List continued on next page.)

FOREIGN PATENT DOCUMENTS

| | | |
|---|---|---|
| 482526 | 7/1976 | Australia . |
| 496129 | 2/1978 | Australia . |
| 0294656 | 12/1988 | European Pat. Off. . |
| 0617195 | 9/1994 | European Pat. Off. . |
| 0666094 | 8/1995 | European Pat. Off. . |
| 0173767 | 7/1906 | Germany . |
| 0281841 | 8/1990 | Germany . |
| 8701963 | 8/1987 | Netherlands . |
| 1530702 | 12/1989 | Russian Federation . |
| 2263714 | 1/1993 | United Kingdom . |
| 2277947 | 11/1994 | United Kingdom . |
| WO8903926 | 5/1989 | WIPO . |
| WO9325800 | 12/1993 | WIPO . |
| WO9428284 | 12/1994 | WIPO . |

*Primary Examiner*—Hoang C. Dang
*Attorney, Agent, or Firm*—Leydig, Voit & Mayer

[57] ABSTRACT

A damage-resistant filter for use in subterranean wells has at least one layer of a filter medium, such as a sintered supported porous membrane, coaxially disposed about a perforated support member. The filter may also include a drainage layer disposed between the inner support member and the filter medium, and a protective covering, such as a perforated cage, surrounding the filter medium. The filter is particularly suitable for removal of sand and other particulates from fluids produced in a well.

25 Claims, 11 Drawing Sheets

U.S. PATENT DOCUMENTS

| | | |
|---|---|---|
| 3,255,821 | 6/1966 | Curlett . |
| 3,262,564 | 7/1966 | Pall et al. . |
| 3,314,481 | 4/1967 | Willman et al. . |
| 3,361,203 | 1/1968 | Rensvold . |
| 3,534,816 | 10/1970 | Showalter . |
| 3,543,854 | 12/1970 | Degen . |
| 3,683,056 | 8/1972 | Brandt et al. . |
| 3,805,856 | 4/1974 | McLennand . |
| 3,958,634 | 5/1976 | Smith, III . |
| 3,984,044 | 10/1976 | Breton et al. . |
| 4,071,937 | 2/1978 | Rohlig . |
| 4,088,580 | 5/1978 | Spurlock . |
| 4,152,264 | 5/1979 | Hanna, Sr. . |
| 4,182,414 | 1/1980 | Sanders et al. . |
| 4,332,524 | 6/1982 | Smith . |
| 4,378,840 | 4/1983 | Lilly . |
| 4,416,586 | 11/1983 | Diedrich et al. . |
| 4,494,603 | 1/1985 | Harguindey . |
| 4,537,254 | 8/1985 | Elson et al. . |
| 4,541,484 | 9/1985 | Salerni ................................ 166/278 |
| 4,548,269 | 10/1985 | Elson et al. . |
| 4,562,039 | 12/1985 | Koehler . |
| 4,575,154 | 3/1986 | Mays ........................................ 299/4 |
| 4,586,880 | 5/1986 | Inao et al. . |
| 4,602,690 | 7/1986 | Steiger . |
| 4,613,369 | 9/1986 | Koehler . |
| 4,624,319 | 11/1986 | Van Der Borght . |
| 4,645,600 | 2/1987 | Filippi . |
| 4,769,156 | 9/1988 | Watts . |
| 4,779,682 | 10/1988 | Pelzer . |
| 4,822,692 | 4/1989 | Koehler . |
| 4,858,691 | 8/1989 | Ilfrey et al. . |
| 4,913,239 | 4/1990 | Bayh, III . |
| 4,917,183 | 4/1990 | Gaidry et al. . |
| 4,921,607 | 5/1990 | Langley . |
| 4,951,749 | 8/1990 | Carroll . |
| 4,977,958 | 12/1990 | Miller . |
| 4,982,788 | 1/1991 | Donnelly ................................ 166/266 |
| 5,004,049 | 4/1991 | Arterbury . |
| 5,050,678 | 9/1991 | Gaidry et al. . |
| 5,078,211 | 1/1992 | Swineford . |
| 5,088,554 | 2/1992 | Arterbury et al. . |
| 5,097,914 | 3/1992 | Grotendorst .............................. 175/59 |
| 5,114,447 | 5/1992 | Davis . |
| 5,141,638 | 8/1992 | Mori et al. . |
| 5,147,530 | 9/1992 | Chandler et al. . |
| 5,150,753 | 9/1992 | Gaidry et al. . |
| 5,165,475 | 11/1992 | Strubbar et al. . |
| 5,183,110 | 2/1993 | Logan et al. . |
| 5,190,102 | 3/1993 | Arterbury et al. . |
| 5,207,934 | 5/1993 | Dovan et al. . |
| 5,211,234 | 5/1993 | Floyd . |
| 5,223,136 | 6/1993 | Gilbert . |
| 5,262,065 | 11/1993 | Hansen . |
| 5,275,726 | 1/1994 | Feimer et al. . |
| 5,293,935 | 3/1994 | Arterbury et al. . |
| 5,295,538 | 3/1994 | Restarick . |
| 5,310,000 | 5/1994 | Arterbury . |
| 5,318,119 | 6/1994 | Lowry et al. . |
| 5,404,954 | 4/1995 | Whitebay et al. ...................... 166/369 |
| 5,413,176 | 5/1995 | Restarick ............................... 166/277 |
| 5,543,047 | 8/1996 | Stovell et al. ....................... 210/493.2 |
| 5,664,628 | 9/1997 | Koehler et al. . |

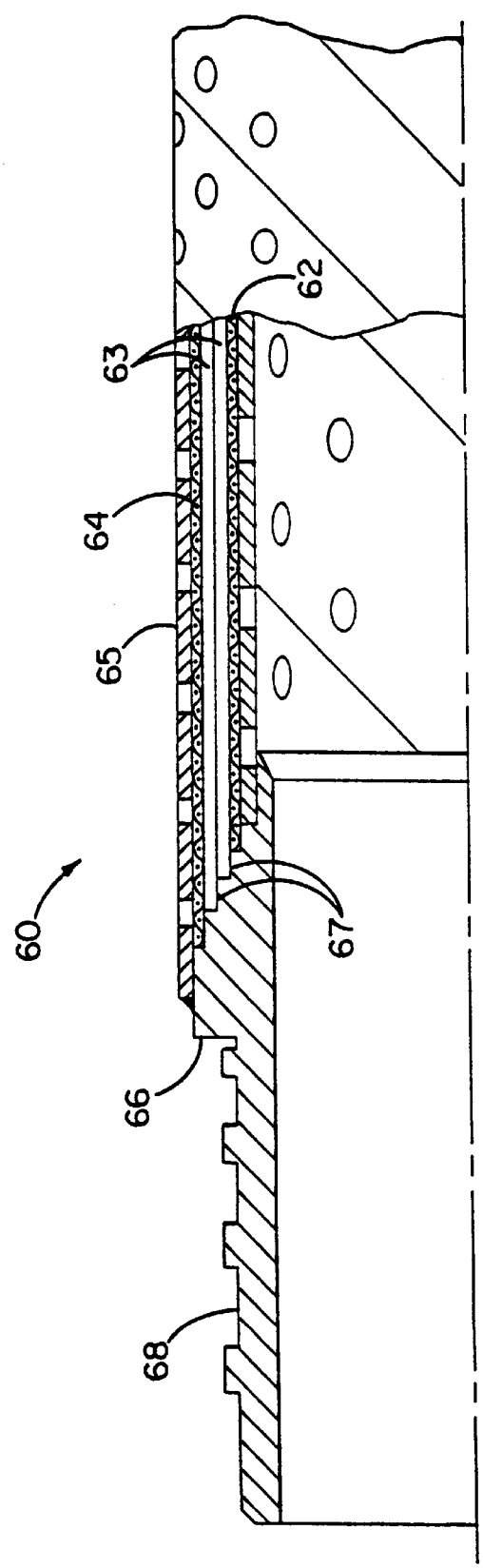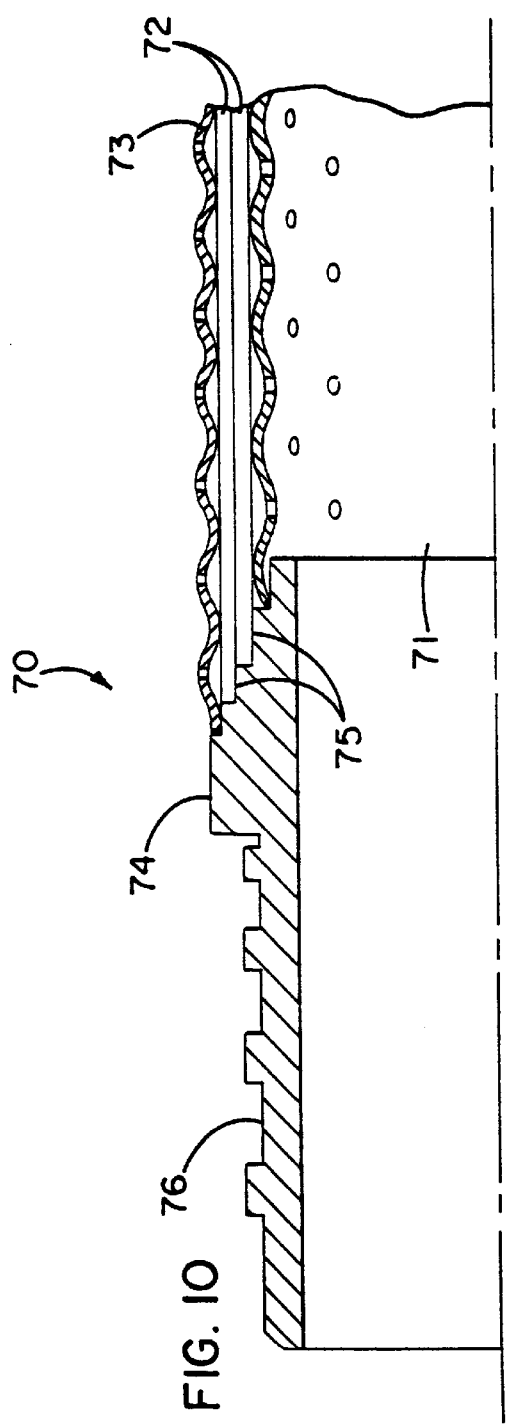

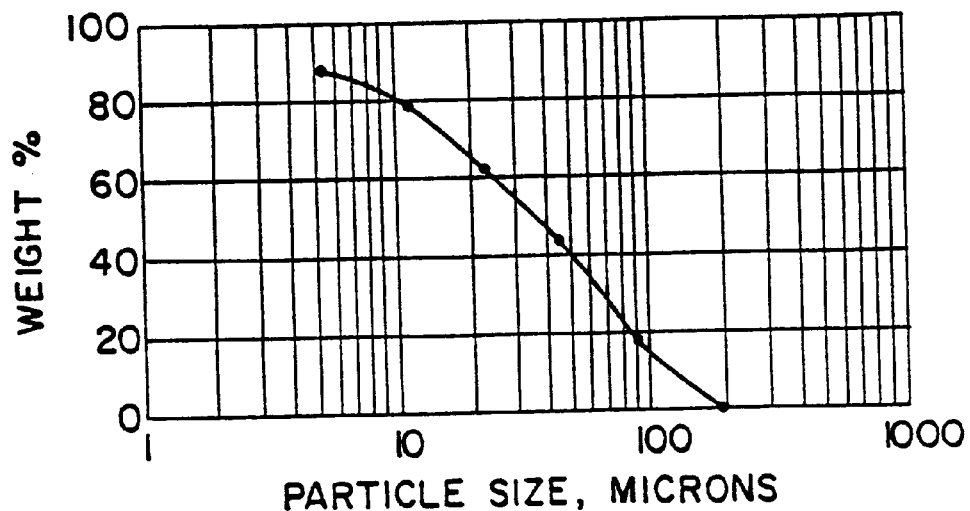
FIG. 16
FIG. 17
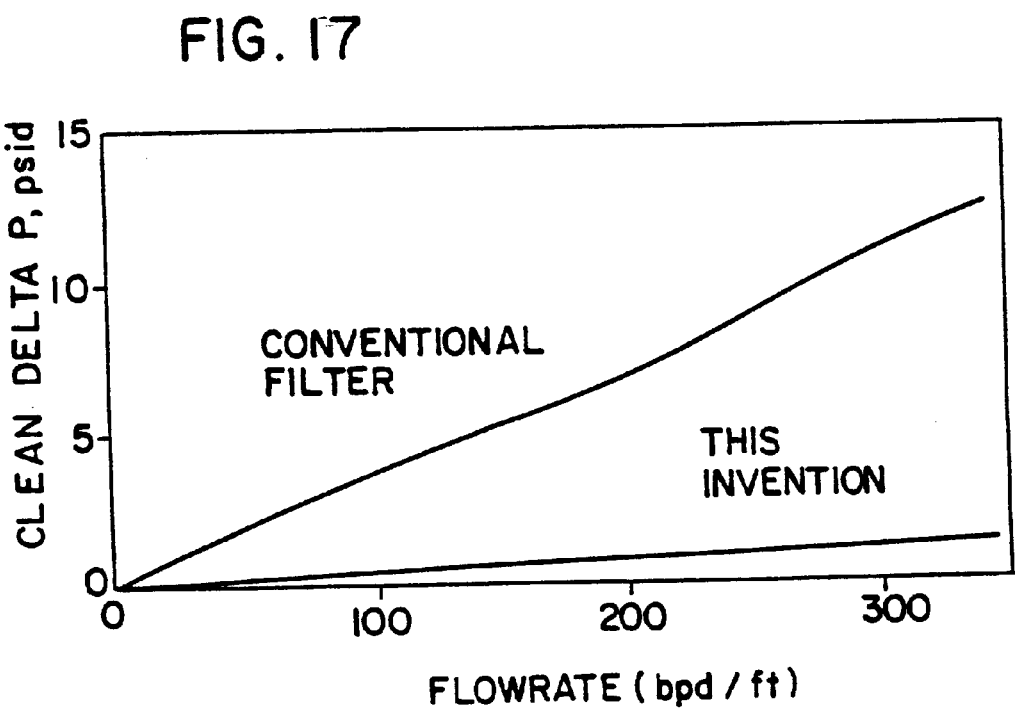

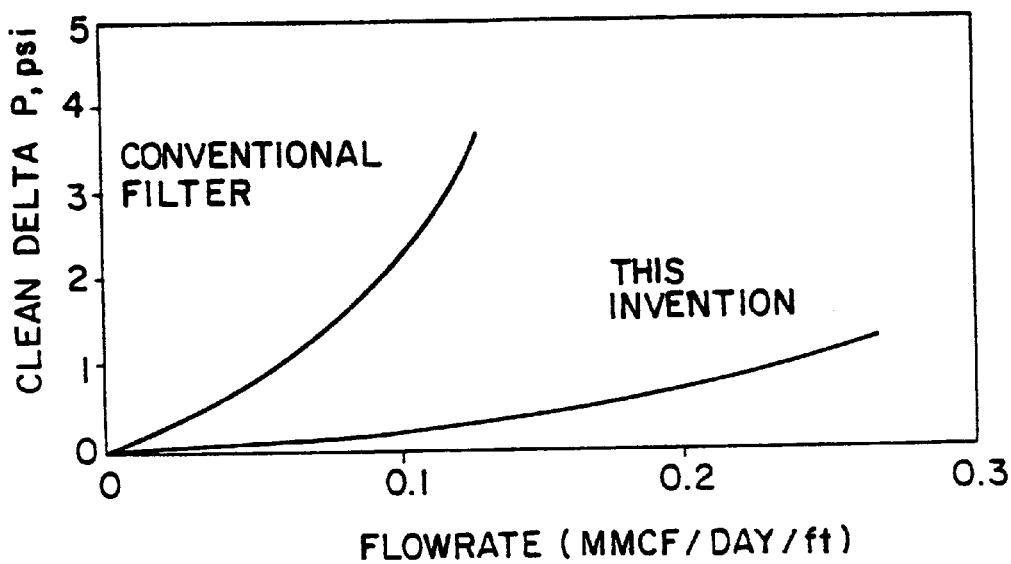
FIG. 18
FIG. 19
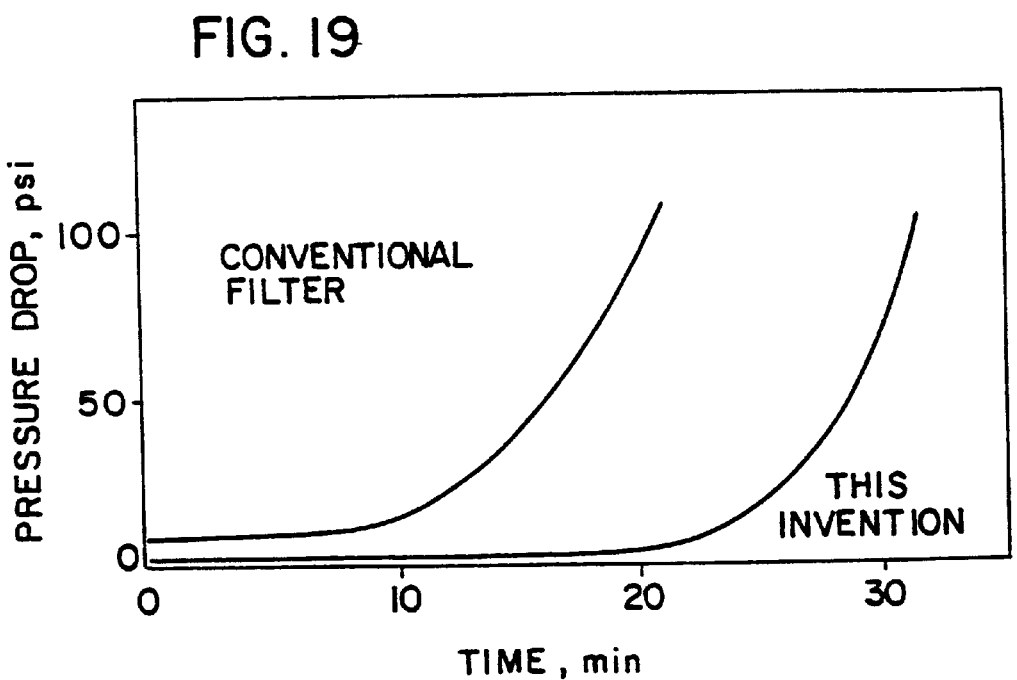

2

METHOD OF REPAIRING A DAMAGED WELL

REFERENCE TO RELATED APPLICATIONS

This application is a division of patent application Ser. No. 08/351,658, filed on Dec. 7, 1994, now U.S. Pat. No. 5,664,628 which is a continuation-in-part of patent application Ser. No. 08/223,149, filed on Apr. 25, 1994, which is a continuation-in-part of patent application Ser. No. 08/065,908, filed on May 25, 1993, both abandoned.

FIELD OF THE INVENTION

This invention relates generally to filters for use in subterranean wells, such as oil and gas wells, water wells, geothermal wells, and in other applications in which it is desired to remove a liquid or gas from the ground without bringing soil particulates, such as sand or clay, up with it.

BACKGROUND OF THE INVENTION

There is such demand for filters capable of being used in subterranean wells in order to remove particulates from liquids or gases produced by the wells. Typical particulates which need to be filtered out are sand and clay, and for this reason, such filters are often referred to as sand screens. Unconsolidated particulate matter, hereinafter referred to as "formation sand," is often associated with subterranean hydrocarbon formations. A major problem in producing hydrocarbon fluids from unconsolidated formations is the intrusion of formation sand, which is typically very fine, into the production fluid and equipment. The presence of sand in the production fluid often leads to the rapid erosion of expensive well machinery and hardware. Furthermore, the shifting of sand in an unconsolidated formation may result in the collapse of perforations purposefully blasted in the formation, thereby reducing or even halting production. In order to prevent the shifting of formation sand, such formations are typically "gravel packed." The gravel packing also acts as a filter, preventing the fine sand from entering the production fluid. Gravel packing involves the introduction of a particular grade of sand into the well bore, often by pumping it down as a dense slurry, into the annulus defined by the inner circumference of the casing wall and the outer circumference of the work string. The gravel pack is often forced through the perforations in the casing wall and incorporated into the formation perforations, thereby stabilizing the formation.

Since the gravel pack itself comprises sand, sand screen assemblies are utilized to prevent the intrusion of gravel pack sand into the well production fluid. If too much formation sand passes through the gravel pack a collapse of the formation can occur. In such instances the well may need to be re-perforated and repacked, usually at substantial expense.

The production of hydrocarbon fluids from horizontal wells is highly desirable in that the producing zone may be much longer than for a vertical well, thereby increasing the production efficiency from a particular formation. However, horizontal well completion involves several technical impediments, and as a result, has, heretofore, not been extensively practiced. Placing a production pipe deep into the earth and then attempting to snake the pipe at an angle approaching ninety degrees along a hole with a radius of curvature as tight as thirty feet requires pipe made from a material which combines mechanical strength with flexibility and ductility. The problem of placing production pipe in the well is often exacerbated by the fact that many horizontal wells are of an unconsolidated nature. Gravel packing and sand screen use are very difficult under such circumstances.

Various types of sand screens have been designed for preventing sand intrusion from unconsolidated formations. Examples include a wire-wrapped screen assembly (see, for example, U.S. Pat. No. 3,958,634), a wire-wrapped screen and prepacked gravel assembly (see, for example, U.S. Pat. No. 5,050,678) and a sintered metal unitary body assembly (see, for example, U.S. Pat. No. 5,088,554). Wire-wrapped screen assemblies exhibit several undesirable tendencies: erosion induced by fine sand that initially flows past the wire/gravel pack interface; plugging with carbonaceous, siliceous or organic solids; and collapse or gaping of the wire screen due to the effects of formation and geo-pressure.

Prepacked wire-wrapped screen assemblies also suffer, to varying degrees, from plugging and the effects of well bore stresses. Furthermore, many prepacked screens have a substantially larger outer diameter than the production pipes around which they are disposed, making initial placement and retrieval difficult.

Prepacked, and to some degree wire-wrapped, sand screens are not particularly damage resistant; they require very careful handling on the drill rig floor and during placement in the well bore. Even a slight bump from the casing wall may create a gap in the wire spacing which could lead to erosion and failure of the screen. Furthermore, conventional wire-wrapped screens and prepacked screens can develop gaps in the wire spacings during placement in a horizontal wall which can lead to a failure in the screen.

Sintered metal unitary sand screens are cost prohibitive for use in all but the most critical situations. Further, the filtration medium of such a sand screen lacks an integral support and is not damage resistant. Homogenous, or monolithic constructions allow a crack to propagate, via stress concentration effects and low ductility, through the entire unitary body thickness. Sintered metal unitary assemblies also have a tendency to plug from fines entrained in the formation fluid. To enhance their performance, sintered metal unitary sand screens may need to be electropolished which adds to their cost.

While sintered metal unitary sand screen assemblies exhibit an effective open area (voids volume), they lack a mechanism to facilitate uniform flow distribution between the unitary body and the perforated pipe. Poor downstream flow distribution (drainage capability) will, in effect, create flow channels, resulting in higher flow velocity areas, higher pressure drops, and early plugging. Some wire wrapped and prepacked wire screens have an efficient use of flow area and flow distribution, but exhibit very low effective open area (voids volume), which may cause a reduced production rate. Furthermore, so-called "armored" screen prepacks have extremely poor flow distribution.

Damage resistance is an important attribute of a filter for use in wells. Even if a filter can be prevented from damage during installation in a well, due to the enormous pressures to which the filter may be subjected during use subsequent to installation, it is frequently impossible to completely prevent damage to the filter. In fact, when an underground formation collapses or shifts, it is not uncommon for a filter surrounded by the formation to undergo substantial deformation, such as elongation or crushing. Ideally, a well filter should be able to experience larger deformations without losing its ability to prevent the passage of particulate matter, but as described above, conventional well filters typically suffer a severe drop in filtering ability even when subjected to even modest deformation.

The problem of reliably removing sand and other particulates from a production fluid is experienced in many types of wells other than oil and gas wells, such as water wells, geothermal wells, and wells for ground remediation.

SUMMARY OF THE INVENTION

Accordingly, it is an object of the present invention to provide a filter for subterranean wells which has excellent damage resistance and maintains its filtering ability even after experiencing substantial deformation.

It is another object of the present invention to provide a filter for subterranean wells which has a high volumetric efficiency, i.e., a high ratio of its inner diameter to its outer diameter.

It is still another object of the present invention to provide a filter suitable for use in both vertical and horizontal wells.

It is yet another object of the present invention to provide a filter which can be used in a wide variety of subterranean wells.

It is a further object of the present invention to provide a filter having excellent erosion and corrosion resistance.

A filter according to one form of the present invention comprises an inner support member having a peripheral wall permeable to fluid, and one or more layers of a porous filter medium disposed around the inner support member. An example of a preferred filter medium is a sintered metal supported porous filter medium comprising metal particulates sintered to a foraminate support member. Another example is a supported or unsupported porous medium formed from nonlinear metallic fibers which are sintered to form a filter sheet.

The inner support member is a hollow member which provides structural rigidity to the filter while permitting the passage of filtrate from the filter medium through its peripheral wall as well as along the hollow center of the inner support member. The peripheral wall may be made permeable to fluid by forming openings such as perforations, slits, or the like in the peripheral wall for the passage of filtrate. Alternatively, the inner support member may have a peripheral wall formed of a porous material having pores which permit the passage of filtrate. Preferably, the openings or pores in the inner support member make substantially no contribution to the overall pressure drop across the filter. The inner support member may be in the form of a pipe, a cage, or other shape, depending upon the strength required of it in a particular application. When the filter is employed in an oil well, an example of a suitable inner support member is a perforated length of production pipe or a perforated core designed to fit over the outside of a length of production pipe.

The filter medium may be disposed around the inner support member in a variety of ways. For example, it may be wrapped around the support member. Alternatively, the filter medium may be pleated to increase the exposed surface area of the filter medium. If the filter medium is pleated, the pleats are preferably in a laid-over state to maximize volumetric efficiency.

The filter may include other layers, such as a drainage layer for assisting filtrate in flowing from the filter medium into the inner support member, diffusion layers for assisting flow of filtrate between the layers of filter medium, and a protective member, such as a wrapped layer or a cage, protecting the outside of the filter.

The filter need not have any particular shape, but most commonly it will be cylindrical to better enable it to resist compressive forces which it may experience underground and to make the filter easier to introduce into a well. Alternatively, the filter may have a different transverse cross-sectional shape, such as polygonal or oblong, and it may vary in cross-sectional shape over its length.

In most applications, fluid will normally flow radially inward through the filter during filtration. However, in some applications, such as acidizing of a well or air sparging, fluid may be directed radially outwards through the filter.

The filter may also include one or more connecting portions by means of which the filter can be connected to tubing, pumps, similar filters, or various equipment.

A filter according to the present invention can be employed in a variety of manners within a well. For example, it can be installed within a gravel pack inside a well bore as a sand screen, it can be installed on the end of production pipe, or it can be installed at the inlet of a down-hole pump to prevent particulate matter from entering the pump. Alternatively, it can be introduced into a well by coiled tubing or by a wire line. It can be installed in the vicinity of or anywhere downstream of the source of the particulates which the filter is intended to remove.

A filter according to the present invention exhibits remarkable damage resistance. Damage resistance here refers to the filter's ability to substantially maintain its integrity when collapsed radially, axially elongated, bent severely during installation (in deviated wells, for example), or subjected to impacts due to rough handling on the rig floor, for example. When a filter according to the present invention is collapsed to about ⅓ to about ½ its original diameter, it preferably retains at least 90% and more preferably at least 95% of its original integrity. As used herein, integrity refers to the stated removal efficiency. In addition, when subjected to axial stresses, the filter undergoes highly uniform axial elongation and thereby maintains a uniform flow distribution along its length.

A filter according to the present invention also has excellent corrosion resistance, since it can be manufactured from a wide variety of corrosion resistant metals. As a result, the filter can withstand highly corrosive well treatment fluids (such as acid and caustic pills) which can degrade the resins employed in resin consolidated sand screens.

Furthermore, since the filter medium of a filter according to the present invention can be formed from thin sheets, the filter has a significantly higher I.D./O.D. ratio than conventional filters for use in wells. A high I.D./O.D. ratio means that for a given I.D., the O.D. of the filter can be smaller than for a conventional well filter, making it easier to introduce the filter into a well. Alternatively, for a given O.D., the I.D. can be larger, thereby maximizing the flow area through the filter.

BRIEF DESCRIPTION OF THE DRAWINGS

FIG. 9 is a longitudinal cross-sectional view of an end portion of another embodiment of the present invention.

FIG. 10 is a longitudinal cross-sectional view of an end portion of yet another embodiment.

FIG. 16 is a graph of the particle size distribution of a slurry used with the test setup shown in FIG. 15.

FIGS. 17–19 show the results of tests performed on a filter according to the present invention and a conventional filter.

DESCRIPTION OF PREFERRED EMBODIMENTS

Figure 1:
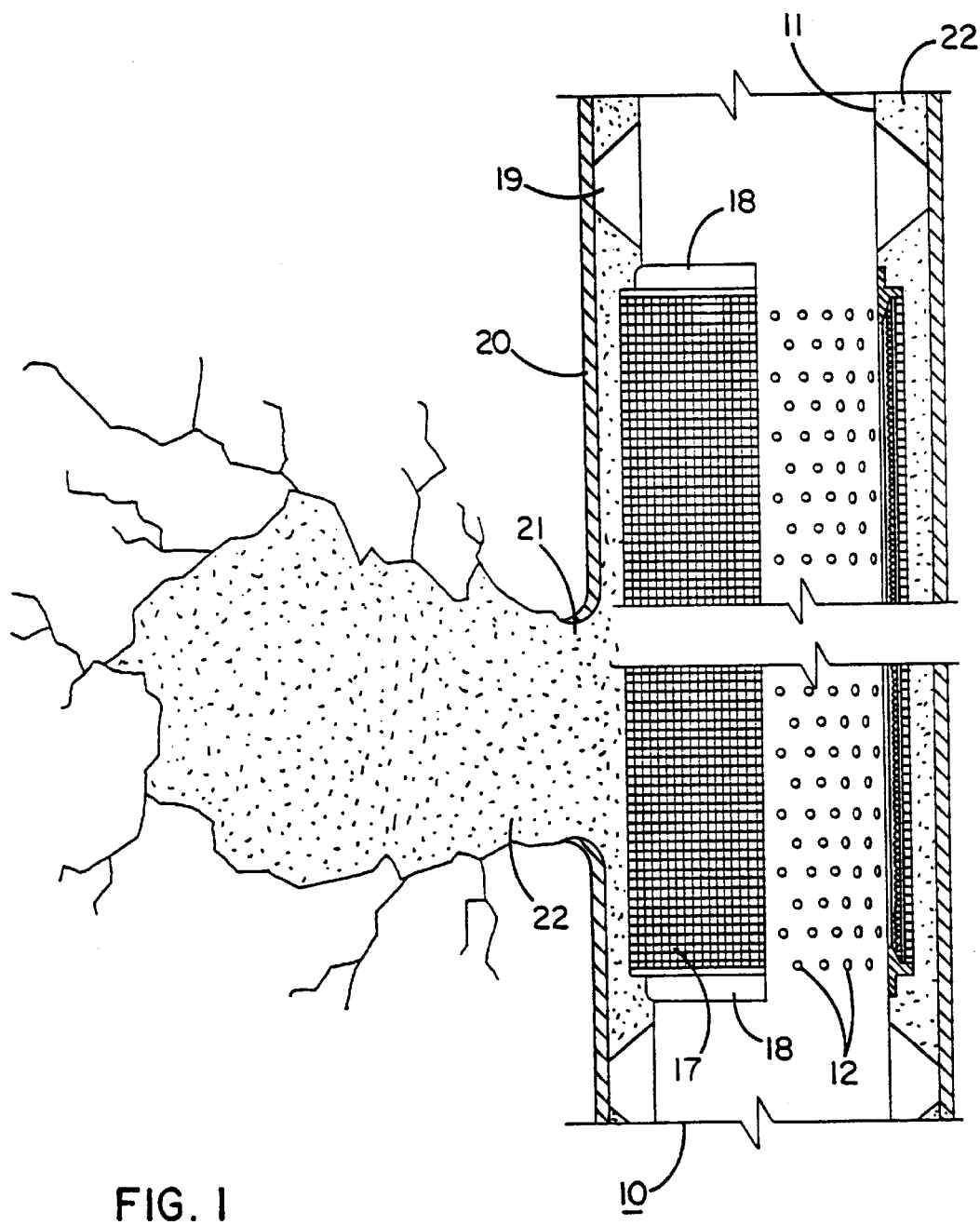
FIG. 1 is a partially cutaway elevation of an embodiment of a filter according to the present invention installed in a well bore.

A number of preferred embodiments of a filter according to the present invention will be described while referring to the accompanying drawings. However, before describing the structure of these embodiments in detail, some of the various applications in which a filter according to the present invention can be employed will be described.

Cased hole gravel pack completion:

A filter according to the invention can be disposed inside a gravel pack in the production zone of an oil or gas well. The typical procedure in forming a gravel pack is to cement production casing in the producing zone of an oil or gas well and to perforate the casing so that oil or gas can enter the casing. A string of production pipe having one or more filter according to the present invention connected in series with it is introduced into the center of the casing. The annulus between the filter and the inner wall of the casing is then packed with sand to form a gravel pack around the filter to capture large particulates in the oil or gas coming from the production zone. The oil or gas flows through the gravel pack, through the filter, and into the string of production pipe, through which it flows to the well head for collection. The filter prevents the sand forming the gravel pack from entering the production.

Open Hole Gravel Pack:

This application differs from a cased hole gravel pack in that the filter is not surrounded by casing. A typical procedure of forming an open hole gravel pack is to install casing in a well bore and cement the casing in place. The formation below the lower end of the casing is then under-reamed to form a large cavity. A string of production pipe having one or more filter according to the present invention connected in series with it is lowered into the well bore through the casing until the filter is located in the cavity. The cavity is then filled with sand to form a gravel pack surrounding the filter. Oil or gas from the formation flows through the gravel pack and the filter and into the production pipe, by which it is transported to the well head.

As an alternative, due to the high damage resistance of a filter according to the present invention, the gravel pack can be dispensed with, and the walls of the cavity can be allowed to fall in around the filter. The filter then performs the filtering function that would be performed by a gravel pack.

Filtration without gravel pack:

There are various situations in which it is unnecessary or uneconomical to install a gravel pack around a filter. For example, when digging an exploratory well in search for oil or gas-producing formations, there is a need to remove sand and other particulates in the fluid coming out of the well in order to protect pumps and other equipment or to prevent the sand from flowing into other wells connected to the exploratory well. However, it is undesirable to go to the expense of installing a gravel pack, since the exploratory well may turn out to be unproductive. Furthermore, in some producing wells, sedimentation is only expected to continue for a few days to a few months, so installing a gravel pack is uneconomical. In such situations, a filter according to the present invention can be installed in a well without a gravel pack as a temporary sand trap. For example, one or more filter according to the present invention can be connected in series with a string of production pipe or to the end of coiled tubing, or it can be introduced into the well with a wire line. A filter according to the present invention can also be used without a gravel pack as a temporary or permanent sand trap in wells having a structure in which it is difficult or impossible to install a gravel pack, such as horizontal wells.

Open Hole Completion:

Open hole completion is used for highly deviated or horizontal wells. Such wells are difficult to gravel pack, since the producing intervals are extremely long and gravel will settle before a complete gravel pack can be obtained. In such wells, a string of production pipe having one or more filter according to the present invention connected in series with it is introduced into an unlined well bore. The formation surrounding the well bore is then allowed to fall in on the filter. Oil or gas produced in the formation flows through the filter and into the production pipe for transport to the well head. Particulates contained in the oil or gas are removed by the filter.

Slim Hole Completion

In typical well completion, after drilling is completed using a drill string, the drill string is removed and replaced with casing and producing pipe. In slim hole completion, the drill string is left in the well at the completion of drilling. Neither casing nor production pipe is installed in the well, and the drill string is used to carry oil or gas to the well head. Slim hole completion is suitable with wells having a small producing zones, which may make the installation of casing and production pipe uneconomical.

A filter according to the present invention can be employed in slim hole completion by installing one or more of the filter in series with the drill string at a point between the drill bit and the well head. Oil or gas generated in the producing zone of the well can pass radially through the filter and be filtered thereby. After passing through the filter, the oil or gases flows into the drill string and is transported to the well head.

Coiled Tubing Completions and Workovers:

As mentioned above, a filter according to the present invention can be used with coiled tubing. Coiled tubing refers to relatively thin-walled tubing, typically of metal, which can be stored in coiled form on a reel and then uncoiled when it is desired to introduce the tubing into a well bore. It is usually smaller in diameter than production pipe, so it can be introduced into a well bore down the center of existing production pipe, or down the annulus between production pipe and casing.

A filter according to the present invention can be used in conjunction with coiled tubing for so-called through tubing workovers of failed sand screens. When an existing sand screen fails while installed within a well, it is extremely difficult to perform repairs, since the sand screen is located at or near the bottom of the production pipe, which may be thousands of feet beneath the ground. The only way to access the failed sand screen is to withdraw the entire string of production pipe from the well bore, an operation which requires a special drilling rig, which may not be immediately available at the production site. A production platform may be connected to 30 or more producing wells. If a sand screen fails in one of the wells, due to the expenses of bringing a drilling rig on location, the operator generally waits until he has a larger number of wells which need to be worked over.

In the interim, the operator can perform a coiled tubing workover inexpensively and keep the damaged well producing. In this procedure, one or more filter according to the present invention is installed in series on the end of coiled tubing, and the coiled tubing is run down the existing production pipe to a desired depth between the damaged sand screen and the well head. The filter may then be attached to the production pipe by a packer that seals the space between the filter and the production pipe. The coiled tubing is then withdrawn from the well for reuse in a different well. Oil or gases entering the production pipe through the damaged sand screen is then filtered by the filter before reaching the well head, whereby harmful particulates are removed. The filter can be employed with or without a gravel pack.

A filter according to the present invention can also be used with coiled tubing in so-called slim hole drilling. In this drilling method, a well bore is formed having a smaller diameter than that of a typical well. Production pipe may or may not be employed. In a situation in which production pipe is not used, coiled tubing having one or more filter according to the present invention attached to its lower end can be introduced into the well bore, and oil or gas produced in the well is carried to the well head by the coiled tubing after passing through the filter.

Wire-Line:

A filter according to the present invention can be lowered into a well bore by a wire-line and sealed in place in a conventional manner, such as by means of nipples on a production pipe. Fluid flowing through the production pipe must pass through the filter in order to reach the well head. Wire-line can be used in various applications, such as in workovers.

Pump protection:

Subsurface pumps (electric pumps, hydraulic pumps, rod pumps, etc.) are commonly used in wells for pumping fluids to the well head. These pumps are prone to plugging and wear from sand, and when damaged must be pulled from the well bore and repaired. Typical maintenance costs tens of thousands of dollars and may be required as frequently as every 3–6 months. A filter according to the present invention can be installed on the pump inlet or upstream of the inlet to protect the pump from particles in the fluid being pumped.

Water wells:

Like oil or gas wells, water wells suffer from silting, and it is desirable to remove sand and other particulates from the water to protect pumps and other equipment associated with the well. A filter according to the present invention is highly suitable for such wells. The damage tolerance of a filter according to the present invention makes it particularly attractive in geographical areas where unstable ground can shift and deform filter installed in wells. Earthquakes in California and Japan have been known to damage water wells. The present filter, because of its excellent damage resistance, can enable even damaged wells to continue to function. It can be installed at the bottom of a well pipe, at the inlet of a pump for the well, or in other locations, with or without a gravel pack.

Geothermal wells:

In geothermal energy production, cold water is pumped down through a well referred to as an injection well into an underground formation containing high temperature sand or a reservoir of hot water. In the formation, the cold water undergoes heat exchange to become hot water or steam, which is brought to the surface by a second well referred to as a producing well. At the surface, the thermal energy of the hot water or steam can be used or harnessed in various ways, such as to power a steam turbine.

The fluid in the producing well may contain sand or other particulates, which can be harmful to turbines or other equipment on the ground. A filter according to the present invention is particularly suitable for installation in a geothermal producing well to remove the sand and particulates from the fluid because the filter can be made of a variety of materials capable of resisting the well fluids, which are at a high temperature and extremely corrosive. One method of employing the filter is to attach it to the bottom end of tubing which is lowered into the producing well and which is used to carry the fluid to the surface.

Ground Remediation:

Ground remediation refers to the cleanup of soil to remove contaminants such as industrial pollutants. One method of ground remediation is referred to as the pump and treat method. In this method, a well is drilled in the vicinity of an accumulation of underground pollutants. Water and the pollutants will enter the well by natural seepage and can be pumped to the surface for treatment. A filter according to the present invention is highly suitable for installation in such wells to separate sand, clay, and other particulates from the water and pollutants which need to be pumped to the surface. The filter can be attached to the tubing through which the fluids are brought to the surface.

Another method of ground remediation is referred to as air sparging. A well is dug in the vicinity of pollutants which are to be removed, and pressurized air is forced into the soil via the well. The air picks up volatile pollutants, such as volatile hydrocarbons, and the air containing the pollutants is either allowed to rise to the surface, or it is collected through another well (referred to as a receiving well) connected to a soil vapor extraction system, which is essentially a blower that creates a vacuum and sucks the vapors to the surface, where they are either released to the atmosphere or processed. A filter according to the present invention can be used to generate the air bubbles required for air sparging. Namely, the filter can be lowered into the first well by a hose or a pipe, and compressed air can be supplied to the filter so as to flow radially outward through the filter. The filter according to the present invention can create substantially uniform bubbles having a desired diameter such as from 0.1 to 100 micrometers in size.

A filter according to the present invention can also be installed in the receiving well to prevent sand and clay particles entrained with the bubbles from reaching the extraction system.

Leaching ponds:

A filter according to the present invention can be installed underground in a drainage system of a leaching pond for recovery of valuable metals from mine ores. For example, the filter can be secured at the downstream end of a drain pipe disposed at the bottom of a leaching pond containing mining ores. The filter can separate sand and other particulates from fluids which leach from the ores in the pond, allowing clear fluids containing ions of valuable metals leached from the ores to be pumped through the drain pipe to the surface for recovery of the metals. A filter according to the present invention is suitable for this application because it can readily be made of a material compatible with the fluid being filtered, which is frequently corrosive and incompatible with polymeric filters.

Figure 2:
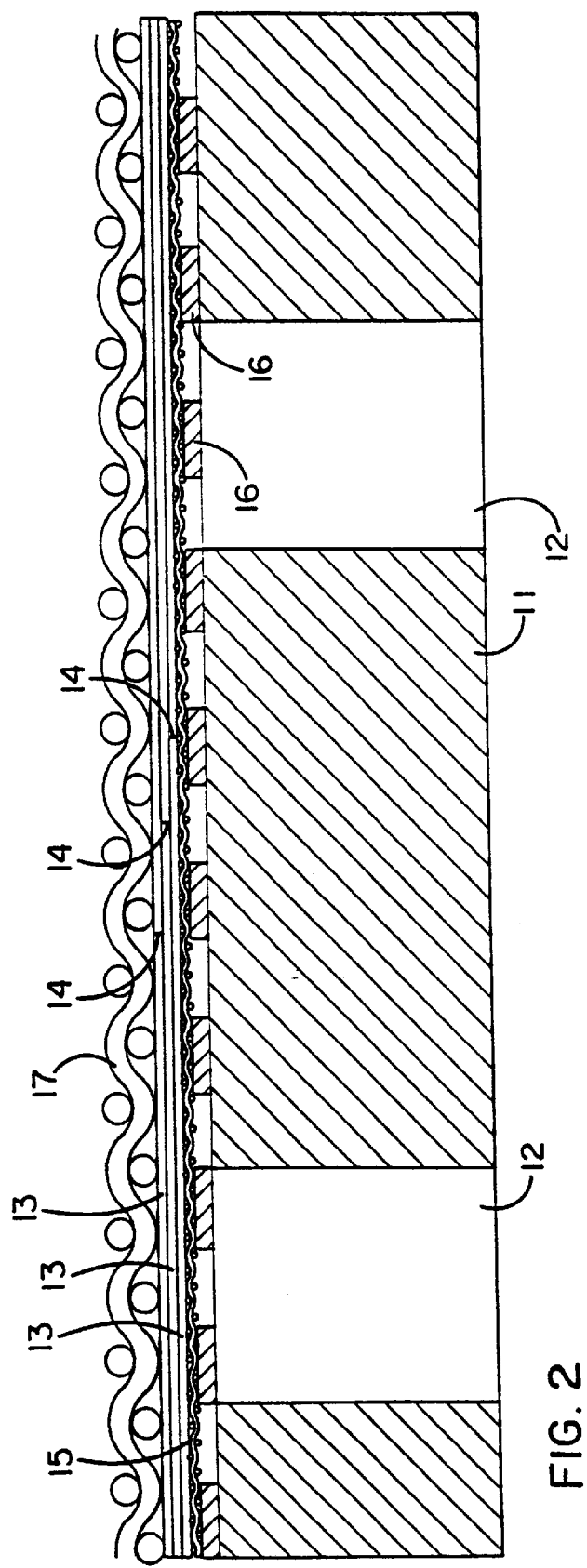
FIG. 2 is an enlarged view of the cutaway section of the embodiment of FIG. 1.

Next, the structure of various embodiments of the present invention will be described. FIGS. 1 and 2 illustrate a first embodiment of a filter intended for use as a sand screen in a well for the production of oil or gas. Filters according to the present invention for use as sand screens include both sand screen assemblies, where a section of perforated pipe, such as a production pipe is part of the structure, and sand screen modules, wherein the structure is designed to be slipped over and secured to a section of perforated production pipe or other pipe.

The filter 10 illustrated in FIGS. 1 and 2 is a sand screen assembly shown installed in a gravel pack 22 in a well bore. The filter 10 includes a perforated inner support member 11 in the form of a length of production pipe which is installed within a casing 20 of the well bore and which is perforated over a portion of its length to permit filtrate to pass through its peripheral wall. The inner support member 11 is connected in series with an unillustrated string of production pipe (also referred to as production tubing) for carrying oil or gas produced within the well bore to the well head. The inner support member 11 may be threaded at one or both if its unillustrated ends or along its entire length. A perforation 21 is formed in the casing 20, and the perforation 21 as well as the annular space between the inner support member 11 and the casing 20 are filled with a gravel pack 22. The inner support member 11 may be equipped with conventional multi-blade centralizers 19, which prevent the inner support member 11 from bumping against the casing 20.

The filter 10 can be installed at any desired location in the production string, but typically it will be positioned near the bottom of the production string. The production string may include one or a plurality of the filters 10, either connected directly with one another or with lengths of production pipe between the filter 10.

The filter includes one or more layers 13 of a porous filter medium wrapped around the inner support member 11. One preferred porous medium is a supported porous medium, which refers to a medium including a foraminate support member, such as a mesh, and particulates sintered to the foraminate support. For example, the particulates may be supported within openings of the foraminate support. The term particulates as used herein is intended to include both powders, fibers, and mixtures thereof. The term fiber is used to refer to an elongated body having a longitudinal dimension which is greater than its diameter. When disposed about an inner support member, a supported porous medium provides a filter having excellent damage resistance, meaning that the filter substantially retains its filtering integrity even when significantly deformed. The excellent damage resistance of a supported porous medium when used in subterranean wells is surprising, since under typical well completion stresses, the materials useful for the present invention would normally be expected to be susceptible to point loading, erosion and shearing. Preferably, the supported porous medium will have a high degree of flexibility. Flexibility, as used herein, refers to the ability of a material to bend about a small radius while maintaining its integrity. Preferred materials for the present invention are those capable of bending about a radius five times the thickness of the material, or less, while still maintaining the integrity of the material. Particularly preferred are materials which can bend about a radius three times their thickness, or less, while maintaining their integrity.

Preferred supported porous media for use in the present invention are supported porous metal sheet materials. Particularly preferred are sintered supported porous metal sheet materials such as those disclosed in U.S. Pat. No. 4,613,369, which is incorporated herein by reference, and which are referred to herein as supported porous membranes. These membranes comprise a foraminate metal support, e.g., a woven wire mesh, and metal particulates contained within the openings in the support, the individual particles of the metal particulates being bonded to each other and to the foraminate support by sintering. Especially preferred are supported sintered metal membranes wherein the particles of metal particulates are no more than one-fifth the size of the smallest dimension of the openings of the foraminate support. These materials are available from Pall Corporation under the trademark PMM®.

An example of a supported porous medium including metal particulates in the form of fibers is one having coarse, non-linear metal fibers, i.e., fibers which are curved, twisted, hooked, corkscrew-shaped, or otherwise bent or undulated and which have a diameter preferably in the range of about 30 to about 300 micrometers and more preferably in the range of about 50 to about 150 micrometers and a length ranging from about 750 micrometers to about 20 mm. A sintered sheet of such fibers can be formed using the liquid laydown process described in U.S. Pat. No. 5,149,360, for example, which is incorporated by reference. Briefly, the metal fibers are suspended in a fluid medium to obtain a stable suspension, which is filtered to leave a wet cake of the fibers. The cake is then dried, compressed, and sintered to produce a metal sheet. If the cake is sintered while supported upon a foraminate support such as a metal mesh, a sintered supported porous medium in which the fibers are supported by the mesh is obtained. Alternatively, the foraminate support can be omitted to obtain a nonsupported sintered porous medium. Either a supported or a nonsupported sintered medium of coarse, nonlinear fibers can be employed as a filter medium in the present invention.

The metal particulates and foraminate metal support (when the latter is employed) can be of any of a variety of metals, such as nickel, iron, chromium, copper, molybdenum, tungsten, zinc, tin, aluminum, cobalt, iron, and magnesium, as well as combinations of metals and metal alloys including boron-containing alloys. Nickel/chromium alloys are preferred. Of these the AISI designated stainless steels which contain nickel, chromium and iron are most preferred.

Examples of suitable woven mesh screens, useful as the foraminate support, include stainless steel mesh screens with a mesh weave of from about 20×20 to about 100×100 with a wire diameter range from about 0.014 to about 0.0035 inches, more preferably a square mesh weave ranging from about 20×20×0.014 to about 40×40×0.009 the first two numbers referring to the number of wires per inch in each direction, the last number referring to the diameter of the wire making up the screen, in inches). Other fine mesh screens also may be used, for example screens having up to 200×1,400 wires per inch.

Various grades of filter media, having different efficiency removal ratings, can be used in the present invention. The grade of medium to be utilized will depend upon the application. For example, when the filter is used as a sand screen, the grade of medium will depend upon the well formation permeability and the sand grain size to be used in the gravel packing. Sand grains used in gravel packing in well formations typically range in size from about 20 to about 1000 micrometers. It is known that sand grains of a particular size are effectively removed by media with a mean pore size of about 3 to about 7 times the grain size. For example, in a well formation with average grain size of 100 micrometers, a medium with a mean pore size of 300 to 700 micrometers would be expected to efficiently prevent sand intrusion. In many applications, a supported porous medium having a mean pore size of approximately 50 to approximately 180 micrometers is suitable for removal of sand from fluids within a well.

A number of methods for measuring efficiency removal are known. Especially useful is the F2 test originally developed at Oklahoma State University in the 1970's. Typically, porous media employed in the present invention will have F2 ratings at beta=100 ranging from about 2 micrometers to about 250 micrometers, and preferably from about 50 to about 180 micrometers, when measured using the modified F2 test as described in U.S. Pat. No. 4,562,039. Typically, porous filter media of this invention will have voids volume in the range of from about 25 to 80%, more preferably 35 to 50%.

A filter according to the present invention exhibits uniform flow distribution. As used herein, uniform flow distribution refers to the utilization of substantially all of the circumferential flow area of the porous medium when placed in contact with a perforated pipe. Preferably, at least 95% and more preferably substantially 100% of the circumferential flow area is utilized. Flow distribution uniformity is enhanced by the use of multiple layers of the filter medium, with drainage and/or support layers.

The number of filter layers 13 which are employed will depend upon the application. From the standpoint of filtering ability, a single layer of the filter medium may be adequate. However, because a filter according to the invention will frequently be used in severe environments, at least two filter layers are usually preferable so that the outer layer(s) can protect the inner layer(s) from damage, and even if the outermost filter layer is damaged, the inner filter layer(s) can continue to perform filtration. Furthermore, the use of multiple layers reduces the susceptibility of the filter to point loading, erosion and shear. Thus, two or more layers, e.g., three, four, six, eight, ten, twenty, thirty, forty, or even more filter layers may be used. Preferred is a structure with two to about nine layers. Generally, the number of filter layers and the thickness of each layer can be decreased as the well in which the filter is employed becomes more shallow. For example, in a filter intended for use in gravel pack in a deep well having a depth of up to 20,000 feet, three to four filter layers are typically suitable. In contrast, when the filter is used in a shallow well with a depth of less than 1000 feet, two filter layers are generally adequate.

The filter layers 13 are preferably all of the same type of material, but they need not be so. In addition, each filter layer may have the same pore size, or the layers may be graded with the outermost layer being coarsest and with the pore size of the filter layers decreasing from layer to layer towards the radial center of the filter.

In this embodiment, as shown in cross section in FIG. 2, three layers 13 of a sintered supported porous metal membrane are helically wrapped around the inner support member 11. Perforations 12 in the inner support member 11 allow inflow of filtered production fluid. One or more drainage layers having a low resistance to lateral flow are preferably disposed between the innermost filter layer 13 and the support member 11 to assist filtrate in reaching the perforations 12 after passing through the innermost layer of the filter medium. The drainage layer(s) also provide support to the filter layers 13 over the perforations 12 in the inner support member 11. In this embodiment, a drainage layer in the form of a woven wire mesh 15 is wrapped around the inner support member 11. In order to provide further support and drainage, a single layer of rectangular wire 16 may be wrapped helically or otherwise directly onto the inner support member 11 to form a support and drainage layer beneath the drainage mesh 15. An example of a suitable rectangular wire wrap is made from stainless steel wire with dimensions of about 1.125×0.0625 inches helically wrapped and spaced approximately 0.25 inches center to center. A wire wrap is useful when the spacing between the perforations 12 of the inner support member 11 is large, since the wire wrap forms large flow channels which can efficiently carry filtrate to the perforations 12. However, when the spacing between the perforations 12 is small and filtrate passing through the inner drainage mesh 15 has only a short distance to travel to reach a perforation 12, a wire wrap can be dispensed with.

The drainage layer(s) are preferably made of a corrosion resistant material, such as stainless steel or similar alloy. When the drainage layer(s) comprise a mesh, the type of weave of the mesh is not critical, and a simple square weave is generally satisfactory. One example of a suitable drainage mesh is a woven stainless steel mesh screen with a square mesh weave of from about 10×10×0.050 to about 60×60×0.005 inches. Especially preferred is a heavy woven metal mesh such as a 40×40×0.009 square mesh weave comprising AISI 300 series austenitic stainless steel. The drainage layer(s) may be applied in any suitable manner, such as by helically, spirally, or cylindrically wrapping them in the same manner as the filter layers. For example, in the embodiment shown in FIG. 2, the rectangular wire wrap 16 is helically wrapped over the inner support member 11, and the drainage mesh 15 of 40×4×0.009 square mesh weave comprising AISI 300 series austenitic stainless steel is helically wrapped over the rectangular wire wrap 16.

Other examples of drainage layers are perforated metal sheets, helically-wound wire of any cross section, axial wires or ribs, threads or grooves machined in the outer surface of the inner support member 11, embossed or dimpled perforated sheets, and coarse monolithic porous structures.

The three filter layers 13 are helically wrapped over the drainage mesh 15. Each filter layer 13 is tack welded to the layer below along the helical seam by resistance welds 14. Alternatively, each layer 13 may be welded to itself without being joined to the adjoining layers. An outer protective layer 17 comprised of a heavy woven wire mesh is shown disposed around the outermost filter layer 13.

The filter layers 13 may be wrapped around the inner support member 11 in any manner which prevents unfiltered fluid from bypassing the filter layers 13. For example, the filter layers 13 can be helically, spirally, or cylindrically wrapped around the inner support member 11. When helical wrapping is employed, the edges of the media sheets are preferably abutting rather than overlapping. In the embodiment of FIG. 2 there are three layers 13 of seven-inch wide filter medium approximately 76 to 85 inches long, helically wrapped at an initial wrap angle of approximately 45°, with no overlap. The wrap angle changes slightly with each successive layer due to the increased outer diameter. The initial outer diameter of the inner support member 11, rectangular wire wrap 16, and woven wire mesh drainage layer 15, over which the filter layers 13 are wrapped, is approximately 3 inches.

In those instances where an overlap is used, the effective number of layers of the filter medium will be increased by overlapping the filter layers 13. The amount of overlap used may vary from 0% (abutting) to as much as about 95%. An example of a suitable overlap is 0.25–0.50 inches.

A diffusion layer, while not essential, may be disposed between two or more of the filter layers 13 to enhance uniform flow distribution. The diffusion layer may be formed from any suitable, porous material which has a lower edgewise flow resistance than the filter layers 13, thus allowing a more uniform distribution of flow between the filter layers 13. The diffusion layer(s) may comprise a supported porous metal membrane which is coarser than the filter layers 13. More preferably, the diffusion layer(s) comprise a woven wire mesh which may be as fine as 80×80× 0.004 or 0.005 or finer. The diffusion layer(s) are preferably wound in the same manner as the filter layers 13. When a diffusion layer is secured to a filter media sheet prior to wrapping, the diffusion layer will, of course, be wound together with the media sheet in the same configuration.

The filter may also include one or more layers of a material, either metallic (such as aluminum) or nonmetallic (such as polyester, cellulose, or wax), which, at the time of manufacture of the filter, is impermeable to the well fluid being filtered but which can be dissolved by a chemical solution to make it permeable when desired. Such a layer or layers can be wrapped over a region of the filter to partially or totally prevent the passage of fluid through that region. When it is desired to employ that region for filtration, a suitable chemical solution can be passed through the filter from the surface to dissolve the layer(s) and open up additional areas of the filter for filtration.

If the various layers of the filter are helically wrapped with an overlap, care is preferably taken to ensure that wrinkling of the filter layers 13 and/or diffusion layers does not result due to the variable outer diameter of the helically overlapped layers. Any wrinkling of the layers may contribute to fluid flow pathways which bypass the filter layers. However, such wrinkling can generally be avoided by using a sufficiently flexible filter medium and proper tension to accommodate the small outer diameter changes as successive layers are wrapped.

The various wrapped layers of the filter, whether helically wrapped to form abutting or overlapping edges, spirally wrapped, or cylindrically wrapped may be bonded or sealed together by any suitable means. As mentioned above, they can be joined by welding. Alternatively, they can be joined by soldering, brazing, adhesive bonding, lock seaming, or the like.

While the outermost filter layer 13 may form the exterior of the filter, the use of a protective member which wraps around or encases the filter layers 13 is preferred for ease of handling and to provide the filter with additional support and damage resistance, especially during handling on a rig floor and during placement into a well bore, for example. Such an exterior protective member may be of any suitable construction and material appropriate for the severe conditions encountered, e.g., rough handling, elevated temperature, corrosive fluids, and the like. The exterior material may, for example, be a heavy woven metal mesh or a perforated cage or tube. Materials such as stainless steel or similar alloy are preferred. An example of a suitable exterior protective material for a sand screen is a woven stainless steel mesh screen with a square mesh weave of from about 1×1×0.125 to about 40×40×0.009. Especially preferred is a heavy woven metal mesh such as a 10×10×0.047 square mesh weave comprising 300 series austenitic stainless steel. The protective outer wrap 17 shown in FIG. 2 comprises AISI 300 series austenitic stainless steel 10×10×0.047 square mesh weave.

The exterior protective material may be applied in any suitable manner. If the protective material is a woven metal mesh, it is preferably wrapped in the same manner as the filter layers 13. The exterior protective material may be secured to the filter layers 13 in such a manner as to compress them in order to provide additional protection to the filter layers 13. In the embodiment shown in FIG. 2, the protective outer wrap 17 is helically wrapped. When the protective member is a perforated metal cage or tube designed to fit over the filter layers 13, it may be desirable to dispose an external drainage layer having low edgewise flow resistance between the outermost filter layer 13 and the inner surface of the cage or tube to assist fluid which has passed through it in reaching the filter layers 13.

The various layers which may be wrapped around the inner support member 11 to form a filter of the present invention, e.g., the filter layers 13, diffusion layers, an exterior protective layer 17, and drainage layers, may be all wrapped in the same direction or they may be wrapped in opposite directions. However, the filter layers 13, if helically wrapped, are preferably all wrapped in the same direction, and, to the extent, other layers are helically wrapped, the other layers are also preferably wrapped in the same direction as the filter layers 13.

The wrapped layers can be secured in place by various techniques, e.g., by welding or brazing techniques. Examples of suitable welding and brazing techniques include tungsten inert gas, laser, electron beam, electrical resistance, nicrobraze, and silver braze. For example, when the layers are helically wrapped, each layer may be continuously resistance welded, along the helical seam, to the layer beneath. Alternatively, it may be welded to itself without being joined to any adjacent layers to permit the layers to shift with respect to each other.

Various techniques may be employed to seal the ends of the filter media to the inner support member 11. For example, end caps 18 may be slipped over the inner support member 11 to positions corresponding to the axial ends of the wrapped layers and welded to at least the filter layers 13 of the wrapped layers and the inner support member 11. The various layers can be wrapped around the inner support member 11 either before or after the end caps 18 are secured to the inner support member 11. Alternatively, the axial ends of the filter media 13 and the other wrapped layers may be welded together directly to the ends of the inner support member 11 without any end caps.

Although not shown in FIG. 1, a filter according to the present invention preferably includes a connecting portion on at least one of its ends by means of which the filter can be connected in series with another member, such as a string of production pipe or a similar filter. An example of a suitable connecting portion is a threaded connection of standard design. When the filter is intended for use in a gravel pack in a deep well, it is generally preferably from a strength standpoint for the connecting portion to be integrally formed with the inner support member of the filter.

For this reason, a standard production pipe is often a suitable inner support member because it is formed with integral connectors. However, when strength requirements permit, the connecting portion of the filter may be non-integral with the inner support member and can be a separately formed connector which is attached to the inner support member by welding or other suitable means. If the lower end of the filter is not connected to another member, such as another filter or additional pipes, it may be sealed off by a suitable means such as a blind end cap secured to the inner support member 11.

Figure 3:
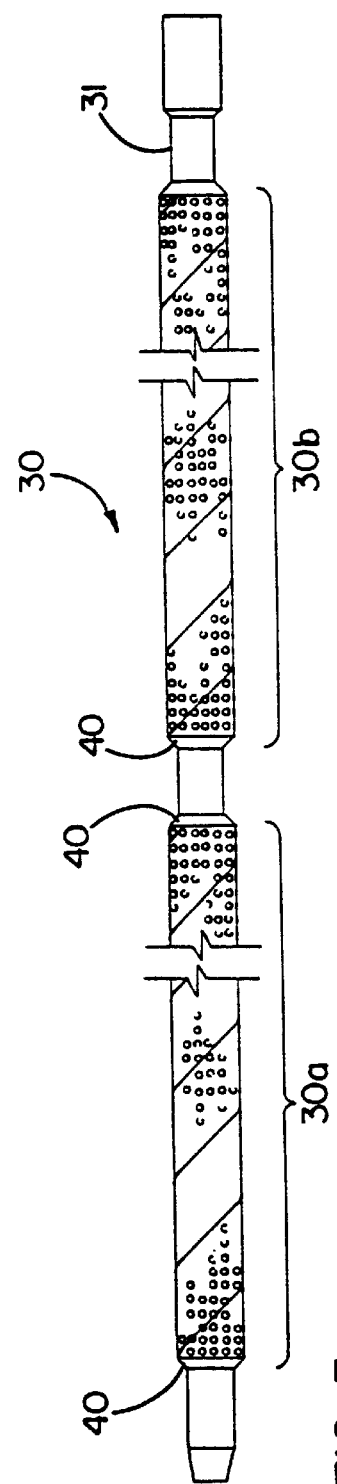
FIG. 3 is a plan view of another embodiment of a filter according to the present invention.
Figure 4:
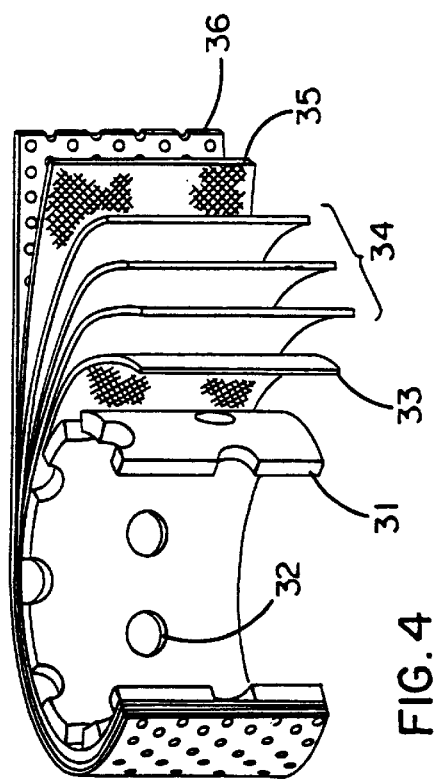
FIG. 4 is a perspective view showing the structure of the embodiment of FIG. 3.

FIGS. 3–6 illustrate another embodiment of a filter 30 according to the present invention. Like the preceding embodiment, this embodiment, because of its heavy-duty construction, is suitable for use as a sand screen assembly in an oil or gas well, either with or without a gravel pack, although it can be used in any of the other applications described above. As shown in FIG. 4, which is a perspective view of a short section of the filter 30 which has been cut open to reveal the structure, it includes an inner support member 31 in the form of a production pipe having perforations 32 formed over a portion of its length. An inner drainage mesh 33, a plurality of layers 34 of a supported porous filter medium, and an outer drainage mesh 35 are wrapped around the inner support member 31 and protected by a perforated tube 36 which surrounds the outer drainage mesh 35. The layers of drainage mesh 33 and 35 and the filter layers 34 can be selected from the materials described above with respect to the first embodiment.

The filter 30 may have a single wrapped section, or as shown in FIG. 3, the filter 30 may be divided into a plurality of longitudinally spaced wrapped sections, of the same or different construction. In this embodiment, filter 30 includes two similar wrapped sections 30a and 30b which are spaced apart by enough room to allow an unillustrated multi-blade centralizer to be installed on the inner support member 31 between the two wrapped sections.

Figure 6:
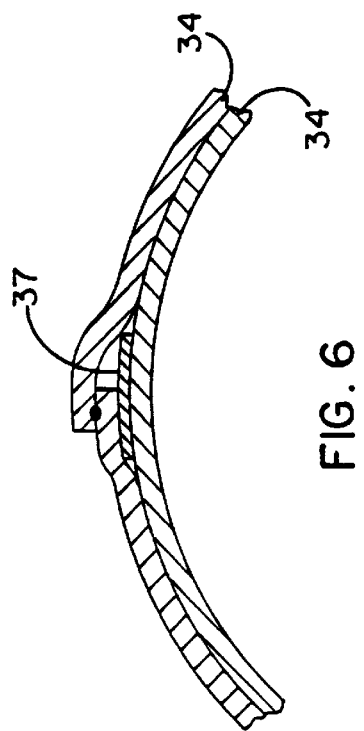
FIG. 6 is a transverse cross-sectional view of a portion of the embodiment of FIG. 3, showing the manner of seam welding a single layer of the filter medium.

In this embodiment, instead of being helically wrapped, the layers of drainage mesh 33, 35 and the filter layers 34 are cylindrically wrapped one by one, each a single time around the inner support member 31 to form a longitudinal seam. The two lengthwise sides of each layer are then joined together along the seam without being joined to the adjoining layers between the longitudinal ends of the layer so that it is possible for each layer to shift with respect to the adjoining layers. FIG. 6 is a transverse cross-sectional view of the longitudinal seam of one of the wrapped layers of the filter. This view shows two concentric layers 34 of the filter medium. The ends of the outer of the two layers 34 are somewhat overlapped to form a longitudinal seam, which is sealed by resistance welding. The seams of adjoining layers of the filter medium are preferably staggered with respect to each other in the circumferential direction of the filter. Therefore, a similar longitudinal seam of the inner layer is not visible in FIG. 6. In order to prevent the two layers from being joined to one another at the time of the welding, a chill strip 37 may be disposed between the layers along the seam and left in place after the completion of welding. The chill strip 37 is preferably a material having high thermal conductivity and/or a high melting point. Some examples of a suitable chill strip are a thin strip of copper sheet, woven copper mesh, ceramic paper such as ceramic felt, or a refractory metal. The seams of the other layers of the filter are sealed in a similar manner. However, any other suitable method can be employed to seal the layers without joining them to adjoining layers. If adjoining layers are permitted to slide with respect to each other, damage to the layers can be reduced when the filter undergoes deformation. A chill strip is generally not necessary between the inner drainage mesh 33 and the inner support member 31, and there is usually no problem if the inner drainage mesh 33 becomes welded to the inner support member 31 during the course of forming the welded seam of the inner drainage layer 33.

Figure 5:
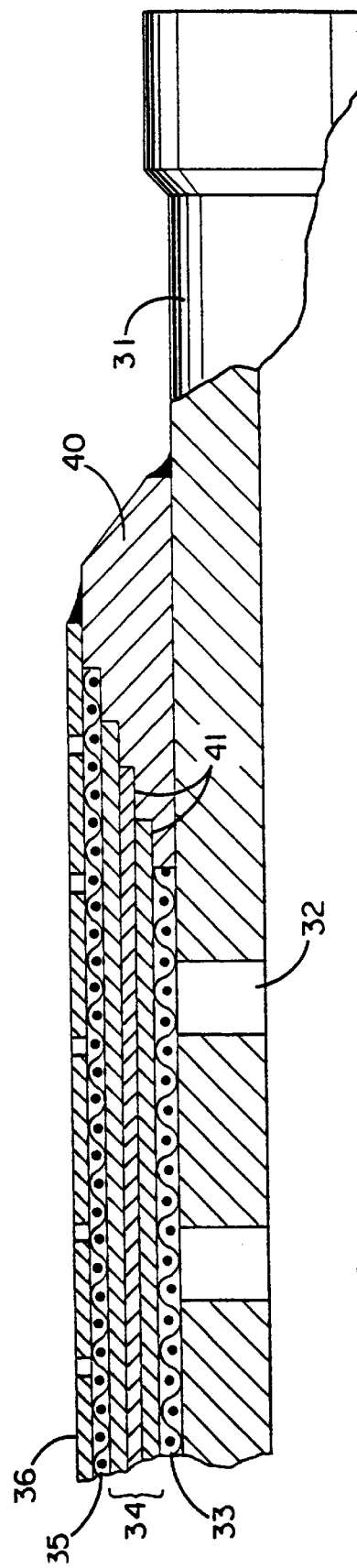
FIG. 5 is a longitudinal partially cross-sectional view of the right end of the embodiment of FIG. 3.

Each of the wrapped sections 30a and 30b is sealed at its ends by end caps 40. FIG. 5 illustrates one of the four end caps 40 of the filter of FIG. 3 in detail. The end cap 40 includes an outer surface facing away from the wrapped layers which it seals and an inner surface facing the wrapped layers. A plurality of annular steps 41 for supporting the various wrapped layers are formed on the inner surface of the end cap 40. In this embodiment, each step 41 supports a single one of the layers, but alternatively each step 41 may support more than one layer. The outermost step 41 supports the protective tube 36 and is secured to the tube 36 by a suitable method, such as welding. The outer surface of the end cap 40 may be sloped to make it easier for the filter to pass smoothly through a well bore. Instead of having steps, the end cap 40 can have a smooth slope on its inner surface, and the wrapped layers can be welded to the slope. At least the filter layers 34 are sealed to the end cap 40 to prevent unfiltered fluid from bypassing them. An example of a suitable sealing method is to form a circumferential weld around the longitudinal end of each wrapped layer, thereby securing the layer to the end cap 40.

To assemble the filter of FIG. 5, the end caps 40 are first welded to the inner support member 31 with a desired spacing between them, and then the various layers of drainage mesh and filter medium are wrapped one by one around the inner support member 31 and the steps 41 of the end caps 40 and welded to form longitudinal seams. The protective tube 36 is then installed around the wrapped layers and connected to the end caps 40.

The protective tube 36 need not have any particular structure. In this embodiment, it comprises a spiral welded perforated tube of a suitable material, such as stainless steel.

A sand screen module according to the present invention is designed to slip over a perforated section of production pipe or other pipe. It will typically include a perforated, hollow inner support member such as a perforated core having an inner diameter larger than the outer diameter of the production pipe on which it is to be installed. The various layers of the sand screen module are wrapped on the core rather than being directly wrapped on the production pipe. The number and type of layers which are disposed around the core can be the same as for a sand screen assembly such as those described above in which a production pipe serves as the inner support member. Like a sand screen assembly, a sand screen module will generally have end caps which are sealingly connected to the core and to the filter layers. The module can be secured around a production pipe in any suitable manner, such as by welding of the end caps to the production pipe. The perforated core may be of any suitable construction and material appropriate for the conditions to be encountered. Examples of suitable materials for a core include stainless steel and similar alloys. Especially preferred is an AISI 300 series austenitic stainless steel perforated tube between 26 and 8 gauge (0.018 to 0.165 inches) thickness with an open area of greater than 40%.

Figure 7:
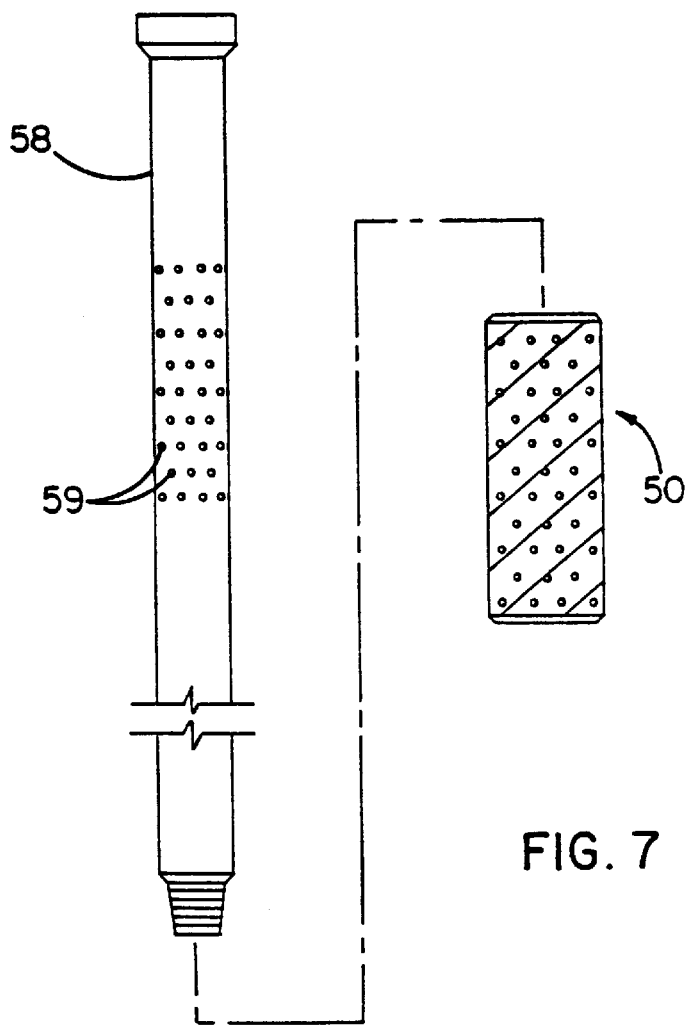
FIG. 7 is an elevation of a sand screen module according to the present invention next to a production pipe on which the module can be installed.
Figure 8:
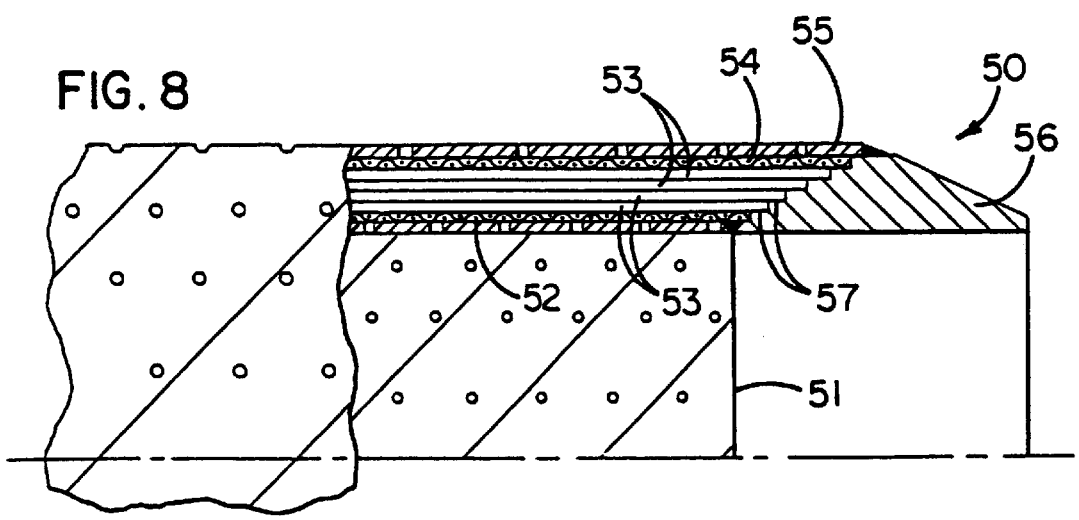
FIG. 8 is a longitudinal cross-sectional view of one end of the module of FIG. 7.

FIGS. 7 and 8 illustrate an embodiment of a sand screen module 50. As shown in FIG. 7, the module 50 has an inner diameter which is sufficiently large that the module 50 can slide over the pin end of a production pipe 58 to a location in which it surrounds perforations 59 formed in the production pipe 58. FIG. 8 is a cross-sectional view of one end of the module 50 of FIG. 7. It includes a spiral welded perforated tube which serves as an inner support member 51 and which is butt welded to an end cap 56 which is similar to the end cap 40 of FIG. 5. The inner support member 51 is surrounded by an inner drainage mesh 52, at least one filter layer 53 (four in this example) of a supported porous filter medium, an outer drainage mesh 54, and a spiral welded perforated tube 55 serving as an outer protective member for the module 50. Preferably, the layers are circumferentially wrapped one by one around the inner support member 51 and individually welded to themselves along a longitudinal seam without being welded to the adjoining wrapped layers, in the same manner as described with respect to FIG. 6. As in the embodiment of FIG. 5, each end cap 56 has a plurality of annular steps 57, and each wrapped layer is supported by and possibly welded to one of the steps 57. The inner support member 51 may be flush with the inner periphery of the end cap 54, as shown in the figure, or the inner diameter of the inner support member 51 may be somewhat larger than the inner diameter of the end cap 56 to leave a space for drainage between the inner support member 51 and the production pipe 58 on which the module 50 is installed. The other end of the module 50 may have an identical structure.

There is no particular restriction on the structure of the inner support member of a filter according to the present invention. When the filter is intended to be connected in series with a string of production pipe, a production pipe is particularly suitable as the inner support member, since the threaded connectors of the production pipe will have the same strength as that of the connectors of the pipe string to which the filter is to be connected. However, hollow members other than production pipe can be used as the inner support member, such as light-weight spiral welded tubing. Furthermore, if the inner support member is expected to be subjected to only low radial compressive forces, light-weight lockseam tubing or each polymeric tubing may be employed.

FIG. 9 illustrates a portion of an embodiment of a filter 60 suitable for use in shallow wells in which relatively low compressive forces are expected to act on the filter 60. Typical uses of this filter 60 include water wells, geothermal wells, and wells for ground remediation. The filter 60 employs a perforated, spiral welded stainless steel tube as an inner support member 61. An end cap 66 (only one of which is shown) is secured to each end of the inner support member 61 by welding. Like the end cap of FIG. 5, the inner surface of the end cap 66 has a plurality of annular steps 67 for supporting the various layers of the filter 60. Unlike the end cap of FIG. 5, this end cap 66 is also equipped with a threaded portion 68 to enable the end cap 66 to be threadingly connected to another threaded member with complementary threads. Each end cap 66 in this embodiment serves not only as a device for sealing the axial ends of the wrapped layers but also as a device for connecting the filter 60 to an adjoining member, such as a pipe string or an identical filter 60. The illustrated end cap 66 is formed with male threads, but it may be instead formed with female threads. If the unillustrated opposite axial end of the filter is to be connected in series to another member, such as a similar filter, the end cap for the other end may likewise be formed with threads or other type of connecting portion. Alternatively, the opposite end may be equipped with a blind end cap to seal that end of the filter 60.

An inner drainage mesh 62, two filter layers 63 of a supported porous medium, and an outer drainage mesh 64 are cylindrically wrapped one by one around the inner support member 61, and the two lengthwise sides of each layer are joined by a longitudinal seam without being joined to the adjoining layers, in the manner described with respect to FIG. 6. A protective member such as a spiral welded perforated tube 65 is then slipped over the wrapped layers and secured to the end caps 66 by welding, for example.

While means for providing drainage between the innermost filter layer and the inner support member is usually desirable, the drainage means need not be in the form of a separate drainage layer such as a mesh or wire wrap. For example, the outer surface of the inner support member can be formed with corrugations, dimples, embossed portion, grooves, small projections, or the like which form channels through which filtrate can flow into the perforations. FIG. 10 illustrates an embodiment of a filter 70 of the present invention equipped with such a drainage arrangement. The structure of this embodiment is similar to that of the embodiment of FIG. 9. It includes an inner support member 71 in the form of a perforated tube, at least one filter 72 (two in this example) of a supported porous medium cylindrically wrapped around the inner support member 71, and a protective member in the form of a perforated tube 73 surrounding the filter layers 72. Both the inner support member 71 and the outer tube 73 are corrugated and directly contact the filter layers 73 with no drainage layers in between. The corrugations define gaps through which fluid can flow from the perforations in the outer tube 73 to the filter layers 72 and from the filter layers 72 to the perforations in the inner support member 71. Since this embodiment does not require drainage layers, it may be economically advantageous in some applications because of lower material and assembly costs. Because it may be difficult or impractical to form corrugations or other surface irregularities in a thick-walled tube, this embodiment is generally more suitable for applications in which the filter is subjected only to moderate radially compressive forces so that the inner support member and the outer cage can be made of a thin-walled material. The inner support member 71 and the outer tube 73 and the filter layers 72 are welded to steps 75 formed on unitary end caps 74 in the same manner as in the embodiment of FIG. 9. The end caps 74 include connecting portions such as threads 76 by which the filter 70 can be connected to another member, such as a similar filter.

Figure 11:
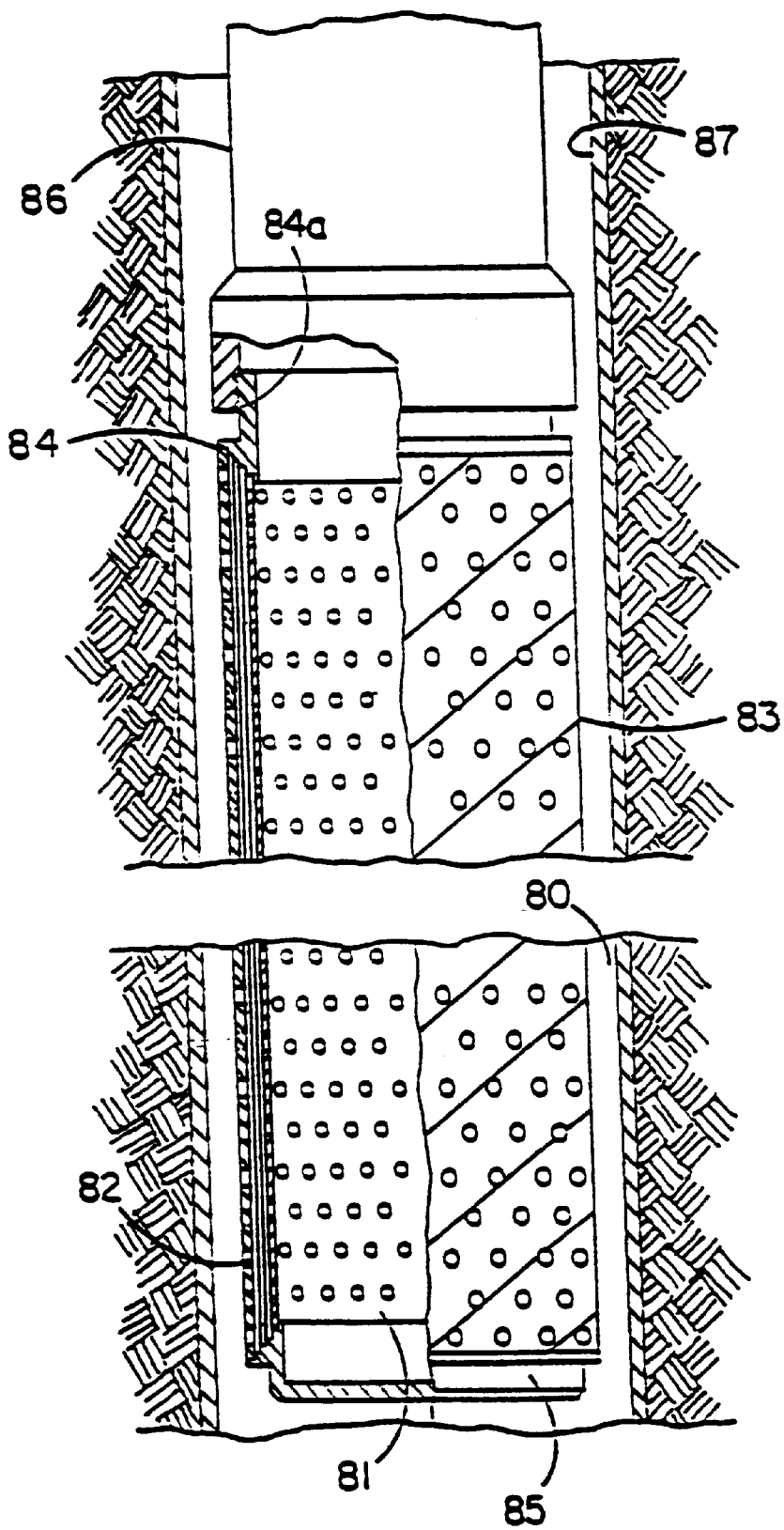
FIG. 11 is a partially cross-sectional schematic elevation of an embodiment of the present invention installed on the lower end of a production pipe.

FIG. 11 illustrates an embodiment of a filter 80 of the present invention being used without a gravel pack. This embodiment is installed on the lower end of a string of production pipe 86 within a well bore so that all fluid entering the production pipe 86 must first flow through the filter 80. The unillustrated upper end of the production pipe 86 extends to the well head. The structure of this embodiment is similar to that of the previous embodiments, and it includes a perforated inner support member 81, such as a perforated steel cylinder or a perforated length of production pipe, and at least one filter layer of a supported porous filter medium wrapped around the inner support member, an inner drainage layer disposed between the filter layers and the inner support member, and an upstream drainage mesh wrapped around the filter layers. The wrapped layers, collectively indicated by reference numeral 82, are protected by a perforated cage 83 such as a perforated stainless spiral welded steel cylinder surrounding the outer drainage layer. End caps 84 and 85 are sealingly connected to the axial ends of the inner support member 81, the wrapped layers 82, and the cage 83 by welding, for example. Like the end caps of FIGS. 9 and 10, each end cap may have an inner surface with a plurality of annular steps for supporting the wrapped layers 82.

The filter 80 can be connected to the string of production pipe 86 in any suitable manner. For example, the upper end cap 84 can be a unitary end cap like that shown in FIG. 9 equipped with threads 84a for engagement with the pin end or box end of the bottom production pipe 86. Alternatively, the upper end cap 84 and the production pipe 86 can be connected using a standard coupling having internal threads for engagement with external threads formed on the upper end cap 84 and external threads formed on the bottom end of the production pipe 86. The end caps 84 and 85 of the illustrated filter are secured to the ends of the inner support member 81, but in a filter of the type described previously in which the end caps are slipped over an inner support member, the inner support member 81 may be formed with threads or other type of connecting portion for engagement with the production pipe 86. The means for connecting the filter 80 to the production pipe 86 may be of a type which enables the filter 80 to be detached from the production pipe 86, but if the life of the filter 80 is expected to be comparable to the life of the production pipe 86, then the filter 80 can be permanently connected to the production pipe 86, such as by welding. The lower end cap 85 of the illustrated embodiment is a blind end cap, but alternatively it may be an open end cap including a connecting portion by means of which it can be connected to another member. For example, if the lower end cap 85 is formed with internal threads, a plurality of similar filters 80 can be connected in series to the bottom end of a production pipe 86.

The outer diameter of the filter 80 shown in FIG. 11 is selected to be smaller than the inner diameter of the well bore in which the production pipe 86 is installed and of the casing 87, if present, surrounding the production pipe 86.

Figure 12:
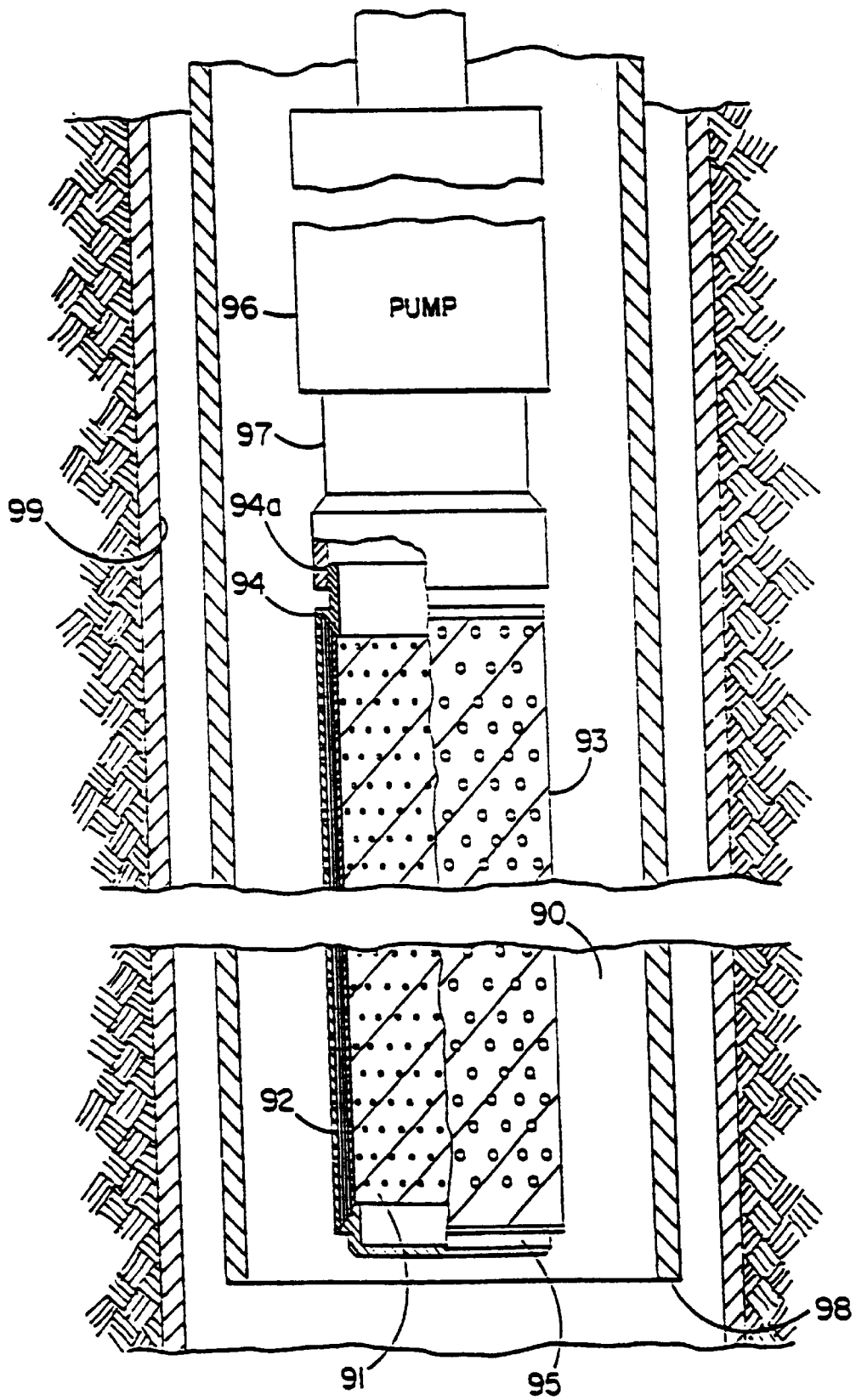
FIG. 12 is a partially cross-sectional schematic elevation of another embodiment of the present invention installed on the inlet of a down-hole pump.

FIG. 12 illustrates an embodiment of a filter 90 of the present invention being used to protect a down-hole pump 96 from damage due to particulate matter present in a well. A down-hole pump is one which is lowered into a well through production pipe 98, for example, and is used to pump fluids to the well head. The embodiment of FIG. 12, which is similar to the embodiment of FIG. 11, is shown installed on the inlet 97 of a conventional down-hole pump 96, which may be electrically or hydraulically driven, or it may be a rod pump, for example, The filter 90 includes a perforated inner support member 91, such as a spiral welded stainless steel tube, and one or more filter layers of a supported porous filter medium wrapped around the inner support member 91, an inner drainage layer disposed between the filter layers and the inner support member 91, and an upstream drainage mesh wrapped around the filter layers. The wrapped layers, collectively indicated by reference numeral 92, are protected by a perforated cage 33 such as a perforated stainless steel cylinder surrounding the outer drainage layer. End caps 94 and 95 are sealingly connected to the axial ends of the inner support member 91, the wrapped layers 92, and the cage 93 by welding, for example. Each end cap may have an inner surface with a plurality of annular steps for supporting the wrapped layers 92, as in the embodiment of FIG. 10, for example.

The filter 90 can be connected to the pump 96 in any suitable manner. Preferably, the filter 90 includes a connecting portion which enables the filter 90 to be readily detached from the pump 96. The inlet 97 of a down-hole pump 96 is frequently equipped with internal or external threads by means of which equipment can be connected to the pump 96, so the illustrated filter 90 includes a connecting portion comprising threads 94a formed on the upper end cap 94 for engagement with the threads of the pump inlet 97. The outer diameter of the filter 90 is preferably selected such that there is clearance between the outer periphery of the filter 90 and the inner periphery of the production pipe 98 so that the pump 96 can be easily raised and lowered within the production pipe 96. The characteristics of the various layers of the filter 90 can be the same as described above for the preceding embodiments. The lower end cap 95 may be tapered or have beveled edges to help guide the filter 90 as it is lowered together with the pump 96 into the production pipe 98. As in the embodiment of FIG. 11, the lower end cap 95 may be blind or it may be an open end cap capable of connection to another member, such as identical filter 90 according to the present invention disposed in series with the first filter 90.

The filter 90 need not be connected directly to the pump inlet 97. For example, a section of pipe could be disposed between the pump inlet 97 and the upper end of the filter 90. Thus, the filter 90 can be installed at any location upstream of the pump inlet 97 along a flow path of fluid leading to the pump inlet 97 so that all fluid entering the pump inlet 97 first passes through the filter 90.

The pump 96 in FIG. 12 is shown installed inside the production pipe 98. Alternatively, it may be installed on the lower end of the production pipe 98, as is common in the oil and gas industry.

In the preceding embodiments, the various layers of the filter are wrapped around an inner support member. However, it is also possible for the filter to comprise a multi-layer pleated composite so as to increase the filtering area. For example, one or more flat sheets of a filter medium can be sandwiched between an upstream and a downstream drainage layer, such as woven metal meshes. The sandwiched layers can then be pleated to obtain a pleated composite, which is formed into a tubular shape and then mounted on a perforated cylindrical inner support member. To protect the pleats from radial forces, they can be surrounded by a rigid cage, or they can be wrapped inside a porous wrap member, such as the protective woven wire mesh of FIG. 2. The pleated composite may contain other layers, such as a diffusion layer between adjoining layers of the filter medium.

Figure 13:
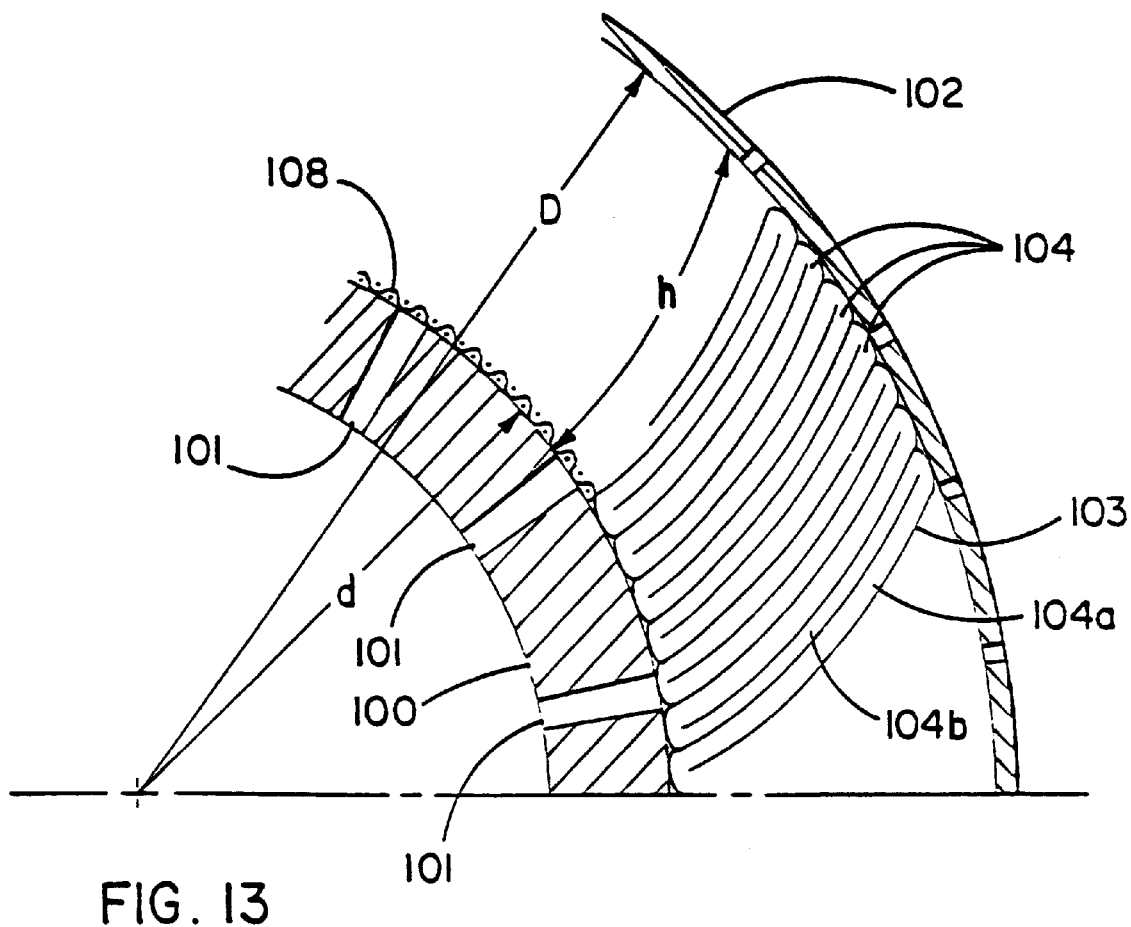
FIG. 13 is a transverse cross-sectional view of a portion of an embodiment of the present invention including a pleated composite.

The pleats of the pleated composite can be conventional radially-extending pleats, or as shown in FIG. 13, they can be so-called "laid-over pleats" in which the opposing surfaces of adjoining legs of the pleats are in intimate contact over substantially the entire height of the pleats. The filter of FIG. 13 comprises a pleated composite 103 disposed between an inner support member in the form of a perforated core 100 and a perforated, rigid external cage 102 both made of a corrosion-resistant material such as carbon steel or stainless steel. The composite 103 has a plurality of pleats 104, and each pleat 104 has two adjoining legs 104a and 104b connected to each other. The opposing inner surfaces of the two legs 104a and 104b of each pleat 104 are in intimate contact with one another over substantially the entire height h of the pleats 104. In addition, the opposing external surfaces of the legs of adjacent pleats 104 are in intimate contact over substantially the entire height h of the adjacent pleats 104. In the laid-over state, the height h of each pleat 104 is greater than the distance between the inner and outer peripheries of the pleated composite ([D-d]/2 in FIG. 13). In this state, the pleats 104 may extend, for example, in an arcuate or angled fashion or in a straight, non-radial direction, but there is substantially no empty space between adjacent pleats 104, and virtually all of the volume between the inner and outer peripheries of the pleated composite 103 is occupied by the pleats 104 and can be effectively used for filtration. The pleats 104 can be formed into a laid-over state by methods well known to those skilled in the art.

Figure 14:
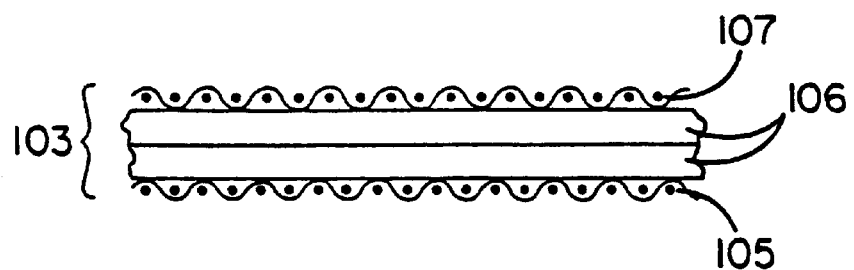
FIG. 14 is an enlarged view of a portion of one of the pleats of the embodiment of FIG. 13.

FIG. 14 is a cross-sectional view showing an example of the structure of the composite 103. It comprises first and second drainage layers 105 and 107, both formed from a woven wire mesh. One or more filter layers 106 of a filter medium, such as a supported porous medium, are sandwiched between the two drainage layers 105 and 107.

In some instances, the perforations 101 in the perforated core 100 may be fairly large compared to the width of each pleat 104. To prevent the pleats 104 from protruding into the perforations 101, a simple coarse wire mesh 108 of stainless steel, for example, may be wrapped around the core 100 to provide support for the radial inner ends of the pleats 104, and the pleated composite 103 can be slipped over the core 100 and the mesh 108.

When a filter according to the present invention is intended for use in deep wells or corrosive environments, all portions of the filter are preferably made of metal to provide the required strength and corrosion resistance. However, in some applications, such as shallow water wells, various portions of the filter may be formed from other materials, particularly polymeric materials. For example, the inner support member, an outer protective cage, and the end caps can all be polymeric materials, and the drainage layers can be polymeric meshes.

EXAMPLES

The present invention will be described in further detail by the following examples.

Example 1

This example illustrates the manufacture of a filter like that illustrated in FIG. 3 for use in a gravel pack. An inner support member in the form of a standard carbon steel API pipe having a nominal size of from 2⅜ inches to 6⅝ inches is perforated with ⅜" diameter holes on a staggered spacing of approximately 1⅛ inches, resulting in approximately 108 perforations per foot of length. Stainless steel end caps (316L stainless steel) are slipped over the pipe and welded to the pipe.

A layer of square weave wire mesh of 316L stainless steel (14×14×0.020 inches) is cylindrically wrapped around the pipe and resistance welded to the end caps and along a longitudinal seam to form an inner drainage layer. Four layers of a 316L stainless steel sintered supported porous metal membrane manufactured by Pall Corporation and sold under the trademark PMM and then wrapped around the inner drainage mesh layer. All the layers of PMM have the same mean pore size selected from the range of 50–180 μm and a uniform thickness of 0.015–0.025 inches per layer. Each layer is individually wrapped and welded to itself and to the end caps in the manner shown in FIG. 6 to obtain a longitudinal seam without the layers being joined to each other between their longitudinal ends, thereby allowing the filter layers to shift during deformation of the filter. The longitudinal seams of adjoining layers are staggered in the circumferential direction of the filter. A copper chill strip measuring 0.010 inches thick is placed between each layer during welding.

A layer of 316L stainless steel square weave mesh (30×30×0.013 inches) is then wrapped around the PMM layers and welded to the end cap and to itself to form a longitudinal seam.

A spiral welded carbon steel outer cage (0.090 inches thick) is then slipped over the wrapped layers and fully GTAW welded at each end to the end caps. The outer cage is perforated with ¼" diameter holes on ½" centers.

The wall thickness of the filter, measured from the O.D. of the pipe to the O.D. of the cage, is approximately 0.31 inches.

Example 2

This example illustrates the manufacture of a filter suitable for connection to coiled tubing. Carbon steel tube having a wall thickness of ⅛" and a nominal size of 1.31 to 1.91 inches is used as an inner support member. The tubing is perforated (⅛" diameter holes) on a staggered spacing of approximately ¼ inches. Solid sections of machined carbon steel tubing formed with threaded connections are butt welded by full penetration GTAW to the axial ends of the tubing to form threaded end connectors. Two end caps of 316 stainless steel having annular steps like those shown in FIG. 5 are welded to the outer periphery of the end connectors.

A layer of 316L stainless steel square weave wire mesh (40×40×0.010 inches) is cylindrically wrapped around the tubing and resistance welded to itself along a longitudinal seam to form an inner drainage layer. Three layers of 316L stainless steel PMM are then wrapped one by one around the inner drainage layer. All the layers of PMM have the same mean pore size selected from the range of 50–180 μm and a thickness of 0.015–0.025 inches. Each layer is individually wrapped and welded in the manner shown in FIG. 6 to obtain a longitudinal seam without the layers being joined to each other between the longitudinal ends of the layers. Each filter layer is also welded to both end caps to seal its longitudinal ends.

Another layer of 316L stainless steel square weave mesh identical to the first mesh layer is then wrapped around the PMM layers and welded to itself and to the end caps.

An outer cage comprising a carbon steel spiral welded perforated tube with a thickness of 0.060 inches is slipped over the wrapped layers and welded to the end caps to complete the construction. The wall thickness of the filter measured from the nominal outer diameter of the inner support member to the outer diameter of the cage is approximately 0.14 inches. The total length of the filter is 11¼ feet, and the axial length of the wrapped filter layers is approximately 10 feet.

One or more filter assemblies are attached in series to the end of coiled tubing. The last filter in the series has a blind end cap at its lower end.

Example 3

This example illustrates the manufacture of a filter like that shown in FIG. 9, which is suitable for use in ground remediation and water wells. A spiral welded stainless steel tube having a wall thickness of 0.09 inches and a nominal size of 2⅜ to 6⅝ inches is used as an inner support member. The tubing is perforated (⅛ inch diameter holes) on a staggered spacing of approximately ¼ inches. Unitary end caps formed of 316L stainless steel by investment casting are butt welded to the axial ends of the tubing. Each end cap has annular steps for supporting a plurality of wrapped layers, and a threaded portion for connection to another member.

A layer of 316L stainless steel square weave wire mesh (40×40×0.010 inches) is cylindrically wrapped around the tubing and resistance welded to itself along a longitudinal seam to form an inner drainage layer. The layers of 316L stainless steel PMM are then wrapped one by one around the inner drainage layer. All the layers of PMM have the same mean pore size selected from the range of 20–180 μm and a thickness of 0.005–0.030 inches. Each layer is individually wrapped and welded in the manner shown in FIG. 6 to obtain a longitudinal seam without the layers being joined to each other. Each filter layer is also welded to both end caps to seal its axial ends.

Another layer of 316L stainless steel square weave mesh identical to the first mesh layer is then wrapped around the PMM layers and welded to itself and to the end caps.

An outer cage comprising a stainless steel spiral welded perforated tube with a thickness of 0.029 inches is slipped over the wrapped layers and welded to the end caps to complete the construction. The wall thickness of the filter measured from the I.D. of the support pipe to the O.D. of the cage is approximately 0.22 inches.

Performance Tests

A number of performance tests were carried out on samples of a filter according to the present invention and of a conventional prepacked filter of the type commonly used in the Gulf of Mexico.

The filter according to the present invention had a structure similar to that illustrated in FIG. 4. It included an inner support member comprising perforated J55 API steel pipe having an inner diameter of 2.44 inches. An inner drainage layer of square weave wire mesh (14×14×0.020 inches), 4 layers of a PPM filter medium (manufactured by Pall Corporation) having a pore rating of approximately 80 micrometers, and an outer drainage layer of square weave wire mesh (30×30×0.013 inches) were cylindrically wrapped around the support member. Each layer was joined to itself by a longitudinal seam weld without being welded to the adjoining layer, as described above with respect to FIG. 6. The wrapped layers were surrounded by an outer cage comprising a spiral-welded perforated steel tube having an outer diameter of 3.44 inches.

The conventional prepacked filter was a model 486-16 filter purchase from Baker Sand Control. It included an inner support member comprising a perforated J55 API steel pipe having an inner diameter of 2.44 inches. This was surrounded by a wedged wire wrapped screen. A sandpack comprising resin-consolidated sand (40/60 mesh=sand having a size between 40 and 60 mesh) was disposed around the wire wrapped screen, and an outer cage comprising a perforated API pipe having an outer diameter of 4.50 inches was disposed over the sandpack.

Both the filter according to the present invention and the conventional filter were equipped with steel end caps to enable the filters to be connected to test equipment.

Filters having the above-described structure were subjected to the various tests described below.

Tensile Test

A tension pull cap was welded to an 8-foot section of each filter and a tensile load was applied to each filter using a hydraulic ram. The load was recorded on an X-Y recorder, which was also connected to a displacement transducer measuring the elongation of the filter under load. The load rate was 5 ksi/min as recommended by API1505.

The test on the conventional filter was terminated upon failure in tension of the inner support member. However, long before this failure, very pronounced damage to the sandpack took place. Gravel and chunks of resin-consolidated sand were lost through the perforations of the cage.

In contrast, the test on the filter of the present invention was terminated when the maximum elongation for the test (2 inches) was reached. Even at this elongation, there was no visible damage to the filter.

The results of this test are shown in Table 1.

TABLE 1

| | Tensile Strength Test | | | |
|---|---|---|---|---|
| | Load at Yield/ Elongation at Yield | Maximum Tensile Strength | Maximum Elongation | Observations |
| Present Invention | 92,000 lbs/0.21% | 110,000 lbs | 2% | No visual failure, only elongation |
| Conventional Filter | 114,000 lbs/0.12% | 165,000 lbs | 0.39% | Base pipe failure, damage to sandpack |

Collapse Test

A 3-ft section of each filter was end-capped with solid aluminum disks, and a heavy rubber sleeve was slid over the filter and the end caps. Hose clamps were fitted around the rubber sleeves at the end caps to form a fluid-tight seal around the end caps. The inside of the filter was connected to the atmosphere through one of the end caps to ensure that it remained at atmospheric pressure. This assembly was then placed in a water-filled pressure vessel rated to 10,000 psi, and an air-driven pump was used to apply pressure to the water inside the vessel. The pressure increase rate was set at less than 50 psi/second. The pressure within the vessel was monitored with a pressure transducer and recorded on a strip chart recorder, the collapse pressure was considered to be the pressure at which the sound of the filter collapsing could be heard and a sudden drop in differential pressure was observed on the recorder.

The results of this test are shown in Table 2. The filter according to the present invention had a lower collapse pressure than the conventional filter. However, its collapse pressure was well above the 5000 psi lower limit typically used in the industry. Furthermore, as will be shown below, it had a significantly higher integrity as collapsed than did the conventional filter.

TABLE 2

| | Collapse Test |
|---|---|
| | Collapse Pressure (psi) |
| Present Invention | 6,910 |
| | 7,400 |
| Conventional Filter | 9,920 |

Crush Test

Three-foot sections of the filters were crushed by radial deformation with a hydraulic press to simulate an increasing load on a filter and investigate the effect on screen integrity. Each filter was crushed to 75% and 40% of its original diameter.

The conventional filter was very sensitive to redial deformation. As soon as it started to be stressed, the sandpack lost sand through the perforations of the outer cage. In contrast, the filter of the present invention did not show any visible sign of damage even when crushed to 40% of its original diameter.

Slurry Test

Figure 15:
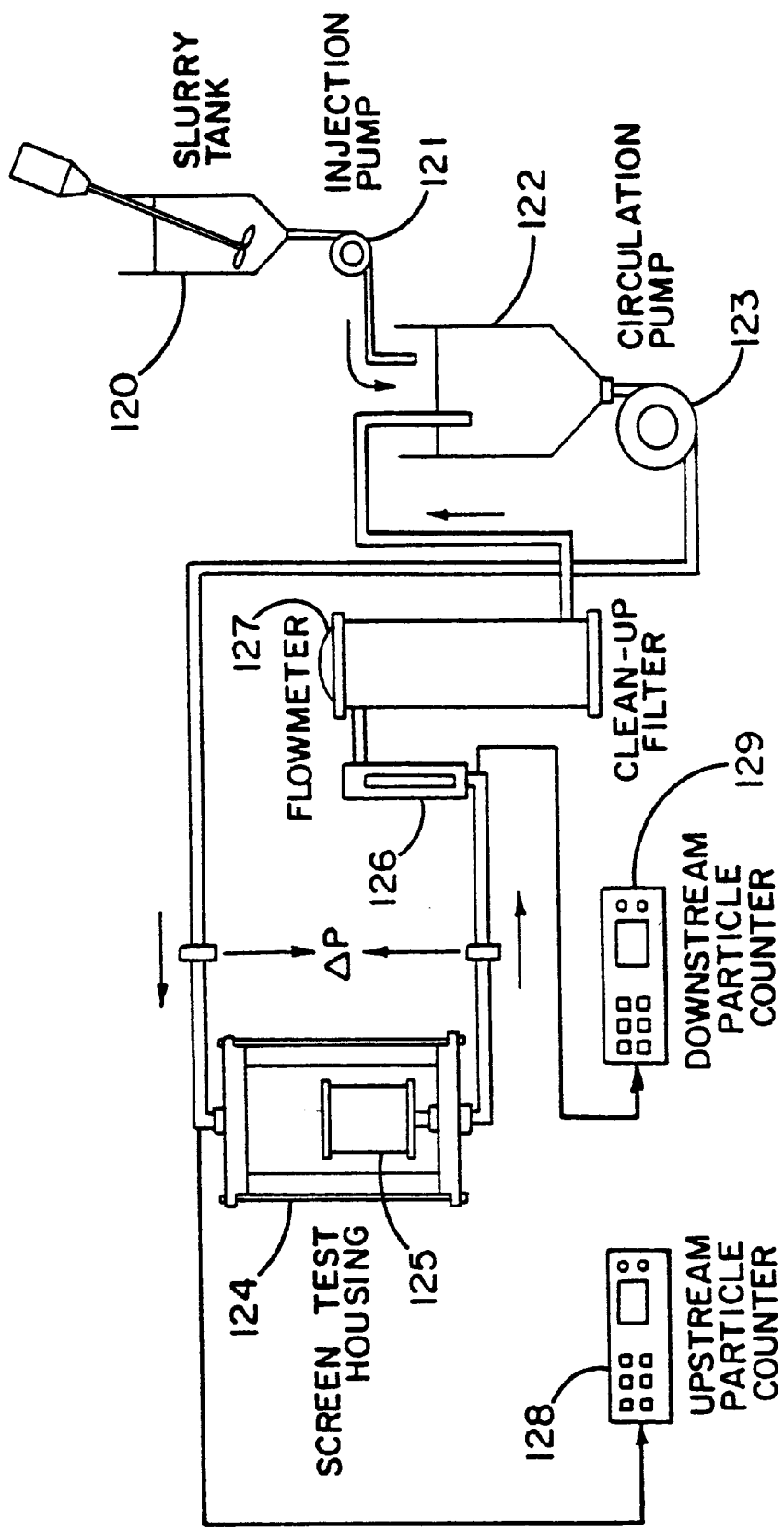
FIG. 15 is a schematic of an experimental test setup used in testing the characteristics of a filter according to the present invention.

Using the test setup illustrated in FIG. 15, samples of the filters employed in the preceding tests were challenged with a 20 mg/L slurry of AC Coarse Test Dust having the particle size distribution given in FIG. 16, both before and after damage, to evaluate their integrity. This test dust accurately simulates the fine fraction of formation sand that may be carried by crude oil and plug the filter in an actual well. To test the characteristics of the filter before damage, 6-inch long samples of the filters were employed.

As shown in FIG. 15, a slurry was prepared in a slurry tank 120 and introduced by an injection pump 121 into a main tank 122 containing a carrier fluid in the form of standard hydraulic oil heated to a controlled temperature of 100° F. by an unillustrated heater. The slurry was introduced at a rate such that the concentration of slurry in the main tank 122 was 20 mg/L. The carrier fluid containing the slurry was pumped by a circulation pump 123 into a filter housing 124 containing a filter 125 to be tested. The fluid passed radially through the test filter 125 and was discharged from the housing 124. From the housing 124, the fluid passed through a flowmeter 126 and a clean-up filter 127, which removed residual dust not separated from the carrier fluid by the filter 125 in the housing 124. The now clean carrier fluid was then returned to the main tank 122. The pressure difference between the inlet and the outlet of the filter housing 124 was continuously monitored up to a maximum pressure drop of 100 psid. An upstream particle counter 128 measured the number of particles at the inlet of the housing 124, and a downstream particle counter 129 measured the number of particles on the outlet side of the housing 124. Particle counts at 10, 30, 50, 60, 80 and 100 micrometers were monitored throughout the test and were used to calculate the retention efficiency of the test filter 125 at these predetermined particle sizes. The flow rate through the test filter 125 was maintained at 4 gpm/linear foot of the filter.

Filter Integrity

As an indication of the integrity of the filters before and after being damaged, the removal by the filters of particles above 80 micrometers in size was tabulated because this size corresponds roughly to the size above which solids can cause damage to production equipment and/or a well bore.

The test result are shown in Table 3. As is clear from these results, the conventional filter significantly lost its integrity when deformed and passed large amounts of particles larger than 80 micrometers, while the filter according to the present invention was very little affected by deformation.

These results can be explained by comparing the structure of the two types of filters. Resin-consolidated sand is a very brittle material. Very little stress is required to crack it and break loose the sand through the perforations in the outer cage. Visual observation of the crushed conventional filter showed that the wire wrapped screen underneath the sandpack became visible because the sandpack had been washed away.

On the other hand, the integrity of a filter according to the present invention remains substantially intact, even after the most massive deformation. This can be attributed to the resilience of the PMM filter medium used in the samples. PMM includes metal powder sintered to a supporting wire mesh. The mesh allows stresses to be locally redistributed to the wires of the mesh, which have a greater ductility than the sintered powder. The mesh easily stretches and deforms while the sintered powder remains virtually stress-free. The layered construction of the filter adds further damage resistance, and the fact that the multiple layers of the filter medium are not welded to each other means that they can slide on top of one another during deformation, preventing tearing of the filter layers.

TABLE 3

| | Sand Production Through Filters | |
|---|---|---|
| | Sand Produced Through the Inventive Filter (particles > 80 microns) | Sand Produced Through the Conventional Filter (particles > 80 microns) |
| Undamaged | 0.9% | 4.6% |
| Crushed to 75% initial diameter | 0.3% | 37.0% |
| 40% initial diameter | 1.2% | 71.4% |
| Collapsed (7000 psi) | 0.4% | — |
| Tensile tested (2% elongation) | 2.2% | — |

Pressure Drop and Erosion Resistance

During the slurry test, it was observed that the pressure drop across the conventional filter decreased substantially. This implies that preferential flow paths through low permeability areas (perforations where no sand is left) are created when the sand gets washed out through the perforations in the outer cage. Once the sand is washed out of a few perforations, the flow of fluid rushed through the few openings where the wire wrapped screen is bars, and the wires start to be eroded by the sand carried in the fluid.

Prepacked filters that are manufactured using unconsolidated sand is disposed between an inner and an outer wire wrapped screen may be the victim of a similar phenomenon. This is not because the sandpack can crack and wash out but because the unconsolidated sand may settle between the inner and outer wire wrapped screens, leaving a small window of bare wire wrapped screen at the top of the filter.

In the case of the filter according to the present invention, there was no evidence of any reduction in pressure drop or integrity, even after major deformation. As a result, the filter medium is expected to hold up much better against erosion since no preferential flow paths are created in it.

Flow Rate vs Pressure Drop

The filter according to the present invention and the conventional filter were subjected to a gas flow test and a liquid flow test to observe pressure drops at different flow rates. The gas flow test was performed at 83° F. and atmospheric pressure in air, while the liquid flow test was performed at 100° F. in a standard lubricating oil.

The test results are shown in FIG. 17 (for oil) and FIG. 18 (for air). It can be seen that in both fluids, the pressure drop across the filter according to the present invention was lower than for the conventional filter.

The pressure drop data in oil can be used to evaluate the permeability of the filter medium of each filter using Darcy's equation for radial flow:

$$K = \frac{Q\mu\ln(OD/ID)}{7.08L\Delta P}$$

where

K: permeability (Darcy)
Q/L: flow rate per linear foot of filter (bbl/day/ft)
ID,OD: inner and outer diameter of the filter medium in the assembly (inches)
$\mu$: fluid viscosity (cp)
JP: pressure drop across the filter (psi)

Table 4 summarizes permeability data for the filter according to the present invention and the conventional filter. It can be seen that the filter according to the present invention had a higher calculated permeability that the conventional filter employing resin-consolidated sand. The relatively low permeability estimated for the conventional filter can be attributed to the resin partially filling up the sandpack pores (the permeability of 40/40 mesh sand is typically around 45 Darcy). The high permeability of the filter according to the present invention is attributed to the improved flow distribution and the use of the PMM filter medium.

TABLE 4

Calculated Permeability

| Porous Media | Present Invention | Conventional Filter |
|---|---|---|
| O.D. | 1.19 in | 4.50 in |
| I.D. | 2.94 in | 3.37 in |
| ΔP at 200 bpd/ft | 0.93 psi | 7.3 psi |
| Calculated Permeability | 39.8 Darcy | 18.0 Darcy |

Uniformity Test

A plurality of samples each measuring 6 inches long were cut from a 10-foot section of a filter according to the present invention and a conventional filter and were subjected to an air flow test to evaluate uniformity. The test was performed by passing air at 10 SCFM through the samples and measuring the pressure drop.

The results are shown in Table 5. The filter according to the present invention had uniform performance, while the resin-consolidated prepacked filter had poor uniformity. These results indicate that the permeability of the resin-consolidated sandpack is not consistent within one 10-foot segment.

This variability was confirmed by observations made during the preparation of the samples. When cutting a filter section to prepare the samples, it was observed that the outer cage and the inner support member of the conventional filter were not concentric at the lengthwise midportion of the filter. As a result, the resin-consolidated sandpack had various thicknesses from the ends of the filter to its midportion, where eccentricity was a maximum. Such a filter can be expected to have a very uneven flow pattern since fluid will be preferentially diverted to the high permeability side (the low thickness side) of the prepacked filter.

TABLE 5

Pressure Drop Across 6" Samples

|  | Pressure Drop Across the Filter (psi) |
|---|---|
| Present Invention | 0.03 |
|  | 0.03 |
| Conventional Filter | 1.17 |
|  | 0.92 |
|  | 0.80 |

Plugging Tendency and Sand Retention Efficiency

The plugging tendency and the sand retention efficiency of each filter were calculated from the data obtained in the slurry test. FIG. 19 illustrates the pressure drop across each filter as a function of time, which is considered to be indicative of the plugging tendency. The conditions selected for the test considerably accelerate plugging compared to the conditions existing in the field. Several factors contribute to make this test a relative indicator rather than an absolute quantitative method. These factors include:

1. the flow rate-the test is accelerated by using a flow rate of 4 gpm/ft instead of the 0.01 to 0.5 gpm/ft observed to the field;
2. the solids loading will obviously affect service life;
3. the particle size distribution of the contaminant.

All of these factors influence plugging by affecting the formation of a filter cake on the surface of the filter. Such a filter cake considerably extends the service life of the filter. The results nevertheless indicate that the filter according to the present invention would tend to plug more slowly than the conventional filter. This result is consistent with the low pressure drop and high permeability obtained for the filter according to the present invention compared with the conventional filter.

There are no standard methods to rate the sand retention efficiency of prepacked filters. In order to compare the filter according to the present invention with the conventional prepacked filter, the removal rating of each filter was defined as the size of particles which could be removed by the filter from a standard lubricating oil with an efficiency of 99%. Based on the results summarized in Table 6, which show the removal efficiency of each filter with respect to various particle sizes in the slurry test, it was determined that the filter according to the present invention was rated at approximately 80 micrometers. The conventional filter had an efficiency of less than 99% for each of the particle sizes tested. However, it was calculated by extrapolation that the conventional filter was rated at around 120–130 micrometers.

TABLE 6

Sand Retention

| Sand Size (μm) | Sand Retention: Present Invention | Sand Retention: Conventional Filter |
|---|---|---|
| 10 | 71.4% | 67.5% |
| 30 | 94.4% | 88.5% |
| 50 | 97.1% | 91.5% |
| 80 | 99.1% | 95.4% |
| 100 | 99.8% | 97.9% |

Void Volume

The void volume of the filter media used in the two types of filters was determined by mercury porosimetry performed on small samples of the resin-consolidated sand (1.5×1.5×1.0 cm) and on a small strip of PPM filter material (3.0×13.0 cm). The results are shown in Table 7. It can be seen that the PPM medium has approximately 50% more void volume than the resin-consolidated sandpack of the conventional filter.

TABLE 7

Pore Volume

| | Present Invention | Conventional Filter |
|---|---|---|
| Pore Volume | 32% | 24% |

While the invention has been described in some detail, it should be understood that the invention is susceptible to various modifications and alternative forms, and is not restricted to the specific embodiments set forth in the figures. It should also be understood that these specific embodiments are not intended to limit the invention but, on the contrary, the intention is to cover all modifications, equivalents, and alternatives falling within the spirit and scope of the invention.

What is claimed is:

1. A method of repairing a damaged well comprising:
   lowering a filter having a supported porous medium into a well having a damaged sand screen, the supported porous medium comprising a foraminate support and particulates sintered to the foraminate support; and
   filtering fluid having passed through the damaged sand screen with the filter.

2. A method according to claim 1 wherein the damaged sand screen is installed on a pipe string, and lowering the filter into the well comprises introducing the filter down the pipe string.

3. A method according to claim 2 comprising introducing the filter into the pipe string using coiled tubing.

4. A method according to claim 2 comprising introducing the filter into the pipe string using wire-line.

5. A method according to claim 1 comprising passing oil or gas through the supported porous medium to remove particulates from the oil or gas.

6. A method according to claim 1 comprising passing water through the supported porous medium to remove particulates from the water.

7. A method according to claim 1 including passing the fluid through a gravel pack surrounding the damaged sand screen before passing the fluid through the filter.

8. A method according to claim 1 wherein the particulates are supported within openings of the foraminate support.

9. A method according to claim 1 wherein the particulates are no more than one-fifth in size of a smallest dimension of the openings of the foraminate support.

10. A method according to claim 1 wherein the foraminate support comprises a metal mesh.

11. A method according to claim 1 wherein the filter includes a plurality of cylindrical layers of the supported porous medium, each layer has longitudinal ends, and adjoining layers of the supported porous medium are not joined to one another between longitudinal ends of the layers, whereby adjoining layers can slide with respect to one another.

12. A method according to claim 11 wherein each layer is joined to itself by a longitudinal seam.

13. A method according to claim 1 wherein the filter includes a plurality of layers of the supported porous medium, each layer having the same removal rating.

14. A method according to claim 1 wherein the filter includes a plurality of layers of the supported porous medium in direct contact with each other.

15. A method according to claim 1 wherein the supported porous medium has an F2 removal rating at $\beta$=100 in the range of from about 2 to about 200 micrometers.

16. A method according to claim 1 wherein the supported porous medium has an F2 removal rating of $\beta$=100 of less than about 80 micrometers.

17. A method according to claim 1 wherein the particulates comprise stainless steel particulates.

18. A method according to claim 1 wherein the supported porous medium is capable of bending about a radius five times its thickness while maintaining its integrity.

19. A method according to claim 1 wherein the supported porous medium is capable of bending about a radius three times its thickness while maintaining its integrity.

20. A method according to claim 1 wherein the supported porous medium has axially-extending pleats.

21. A method according to claim 1 including introducing the fluid into an inlet of a downhole pump after passing the fluid through the supported porous medium.

22. A method according to claim 1 wherein the particulates comprise fibers having a length of about 750 μm to about 20 mm.

23. A method according to claim 1 wherein the particulates comprise fibers having a diameter of about 30 μm to about 300 mm.

24. A method according to claim 22 wherein the particulates comprise fibers having a diameter of about 50 μm to about 150 mm.

25. A method according to claim 24 wherein the fibers are non-linear.

* * * * *